United States Patent

Camras

[15] 3,683,107

[45] Aug. 8, 1972

[54] LONGITUDINAL SCAN MAGNETIC RECORDING AND REPRODUCING SYSTEM FOR COLOR TELEVISION SIGNALS

[72] Inventor: Marvin Camras, Glencoe, Ill.

[73] Assignee: IIT Research Institute, Chicago, Ill.

[22] Filed: Aug. 10, 1970

[21] Appl. No.: 62,601

Related U.S. Application Data

[63] Continuation of Ser. No. 528,934, Feb. 21, 1966, abandoned, Continuation-in-part of Ser. No. 126,121, July 24, 1961, Pat. No. 3,334,192, Continuation-in-part of Ser. No. 344,075, Feb. 11, 1964, Continuation-in-part of Ser. No. 389,021, Aug. 12, 1964, Pat. No. 3,469,037, Continuation-in-part of Ser. No. 393,282, Aug. 31, 1964, Pat. No. 3,506,780, Continuation-in-part of Ser. No. 401,832, Oct. 6, 1964, Pat. No. 3,495,046, Continuation-in-part of Ser. No. 407,402, Oct. 29, 1964, Pat. No. 3,513,265, Continuation-in-part of Ser. No. 439,340, March 12, 1965, Pat. No. 3,502,795, Continuation-in-part of Ser. Nos. 456,192, May 17, 1965, Pat. No. 3,449,528, and Ser. No. 493,271, Oct. 5, 1965, Pat. No. 3,531,600.

[52] U.S. Cl. .......178/5.4 CD, 178/6.6 A, 200/51.09, 200/51.1

[51] Int. Cl. .......................................H04n 5/78

[58] Field of Search ...178/6.6 A, 5.4 CD; 200/51.09, 200/51.1; 179/100.11

[56] References Cited

UNITED STATES PATENTS

| | | | |
|---|---|---|---|
| 3,320,370 | 5/1967 | Barry | 178/6.6 A |
| 2,768,234 | 10/1956 | Popp | 200/51.1 |
| 3,018,330 | 1/1962 | Soja | 178/100.11 |

*Primary Examiner*—Robert L. Griffin
*Assistant Examiner*—Donald E. Stout
*Attorney*—Hill, Sherman, Meroni, Gross & Simpson

[57] ABSTRACT

The present invention relates to the magnetic recording of televisions signals. The source of video signals is a television receiver. Adapter circuitry is disclosed which includes a detachable cable for coupling the magnetic transducing heads with the video output of the receiver for the purpose of recording the broadcast signal or the display of the reproduced video signal derived from the tape. Detachment of the cable places the television receiver in a condition to allow the display of the broadcast video instead of recording the broadcast video signal.

2 Claims, 19 Drawing Figures

INVENTOR.
MARVIN CAMRAS

BY Hill, Sherman, Meroni, Gross & Simpson ATTORNEYS

INVENTOR.
MARVIN CAMRAS

BY Hill, Sherman, Meroni, Gross & Simpson
ATTORNEYS

INVENTOR.
MARVIN CAMRAS

BY Hill, Sherman, Meroni, Gross & Simpson
ATTORNEYS

PATENTED AUG 8 1972

3,683,107

SHEET 4 OF 6

INVENTOR.

MARVIN CAMRAS

BY Hill, Sherman, Meroni, Gross & Simpson ATTORNEYS

INVENTOR.
MARVIN CAMRAS
BY Hill, Sherman, Meroni, Gross & Simpson ATTORNEYS

INVENTOR.
MARVIN CAMRAS

BY Hill, Sherman, Meroni, Gross & Simpson
ATTORNEYS

LONGITUDINAL SCAN MAGNETIC RECORDING AND REPRODUCING SYSTEM FOR COLOR TELEVISION SIGNALS

CROSS REFERENCE TO RELATED APPLICATIONS

The present application is a continuation in part of my copending applications U.S. Ser. No. 126,121 now U.S. Pat. No. 3,334,192, filed July 24, 1961, U.S. Ser. No. 344,075 filed Feb. 11, 1964, U.S. Ser. No. 389,021 now U.S. Pat. No. 3,469,037, filed Aug. 12, 1964, U.S. Ser. No. 393,282 now U.S. Pat. No. 3,506,780, filed Aug. 31, 1964, U.S. Ser. No. 401,832 now U.S. Pat. No. 3,495,046, filed Oct. 6, 1964, U.S. Ser. No. 407,402 now U.S. Pat. No. 3,513,265, filed Oct. 29, 1964, U.S. Ser. No. 439,340 now U.S. Pat. No. 3,502,795, filed Mar. 12, 1965, U.S. Ser. No. 456,192 now U.S. Pat. No. 3,449,528, filed May 17, 1965, and U.S. Ser. No. 493,271 now U.S. Pat. No. 3,531,600, filed Oct. 5, 1965, and the disclosure of each of said copending applications is incorporated herein by reference in its entirety.

This invention relates to a wide band transducing system and method, and particularly to a system for recording and/or reproducing color television signals.

In a preferred embodiment of the present invention three demodulated color signals from a conventional color television receiver are transmitted by the circuitry of the present invention to a magnetic tape recorder. Preferably the magnetic transducer heads embody features of the above identified copending applications. Thus each playback head unit preferably has high and low impedance windings thereon with resonant frequencies selected so as to provide a significantly increased range of useful output frequencies. A specifically designed fully transistorized playback amplifier is preferably associated with each head unit for providing in conjunction with the high and low impedance windings a relatively uniform response over the required frequency spectrum.

For maximum economy it is preferred that the playback head units also be used for recording. Preferably the demodulated color signals are supplied essentially only to the respective low impedance windings during recording. Further economies (and improved shielding during playback) may be achieved by providing a housing of magnetic shielding material for the head units which also serves as part of cross field magnetic circuits for the respective head units. The cross field magnetic circuits are preferably energized by respective electrical conductors arranged to extend along the sides of the head units and adjacent the record medium path at the transducer gaps for optimum operating efficiency and for maximum simplicity in construction.

The head units and circuit concepts of the present invention may be applied to various transducer configurations such as the right angle or skew angle rotating head configurations wherein the head units scan successive right angle or skew angle tracks on a longitudinally moving, relatively wide record tape. An important contribution of the present invention, however, resides in a system for transducing color television signals by means of stationary head units which scan longitudinal tracks on the record medium. For example, a system has been devised and successfully operated for recording and playing back broadcast color television signals on a 1/4 inch magnetic tape record medium with provision for more than one program on the same tape. Using the preferred head configuration, and preferred electric circuitry, such color television signals may be recorded and reproduced with scanning speeds of the head relative to the record medium of the order of 120 inches per second or less and with the use of low cost tape transports, comparable in cost to present home (non-professional) type sound recorder transports. Head-to-tape scanning speeds of 60 inches per second or less are feasible using the teachings of the present invention, in contrast to head velocities of the order of 1,500 inches per second which are typical for present rotating head systems.

It is an object of the present invention to provide an economical color television transducing system such as would be particularly suitable for home or educational uses.

Another object of the invention is to provide a wide band transducer system capable of effective transducing of signals with frequency components extending into the megacycle range at head scanning speeds of 120 inches per second or less.

A further object of the invention is to provide a system and method for effectively transducing color television signals and yet which need have an upper frequency response limit of only two megacycles per second or even one megacycle per second.

Still another object of the invention is to provide a system for recording and/or reproducing color television signals together with the related audio intelligence which is readily connected with present commercial broadcast receiver circuitry and which requires only three video transducer head units, or less.

Yet another object of the invention is to provide a system for recording and/or reproducing color television signals such as those which may be obtained from present commercial broadcast receivers, with the use of a low cost tape transport and stationary head units scanning the tape in the direction of tape movement.

Another and further object of the invention is to provide a system for recording and reproducing color television and audio signals with the use of broadcast receiver circuitry and a minimum number of additional low cost transistors of the order of 12.

Yet another and further object of the invention is to provide a color television record-playback system having great simplicity of operation with only a record-play switch and a tape transport selector being required (a color balance control being optional).

The objects of the aforementioned applications for patent are also applicable to the present disclosure and are specifically incorporated by reference at this point in the present specification.

Other objects, features and advantages of the present invention will be apparent from the following detailed description taken in connection with the accompanying drawings, in which.

Figure 4A:
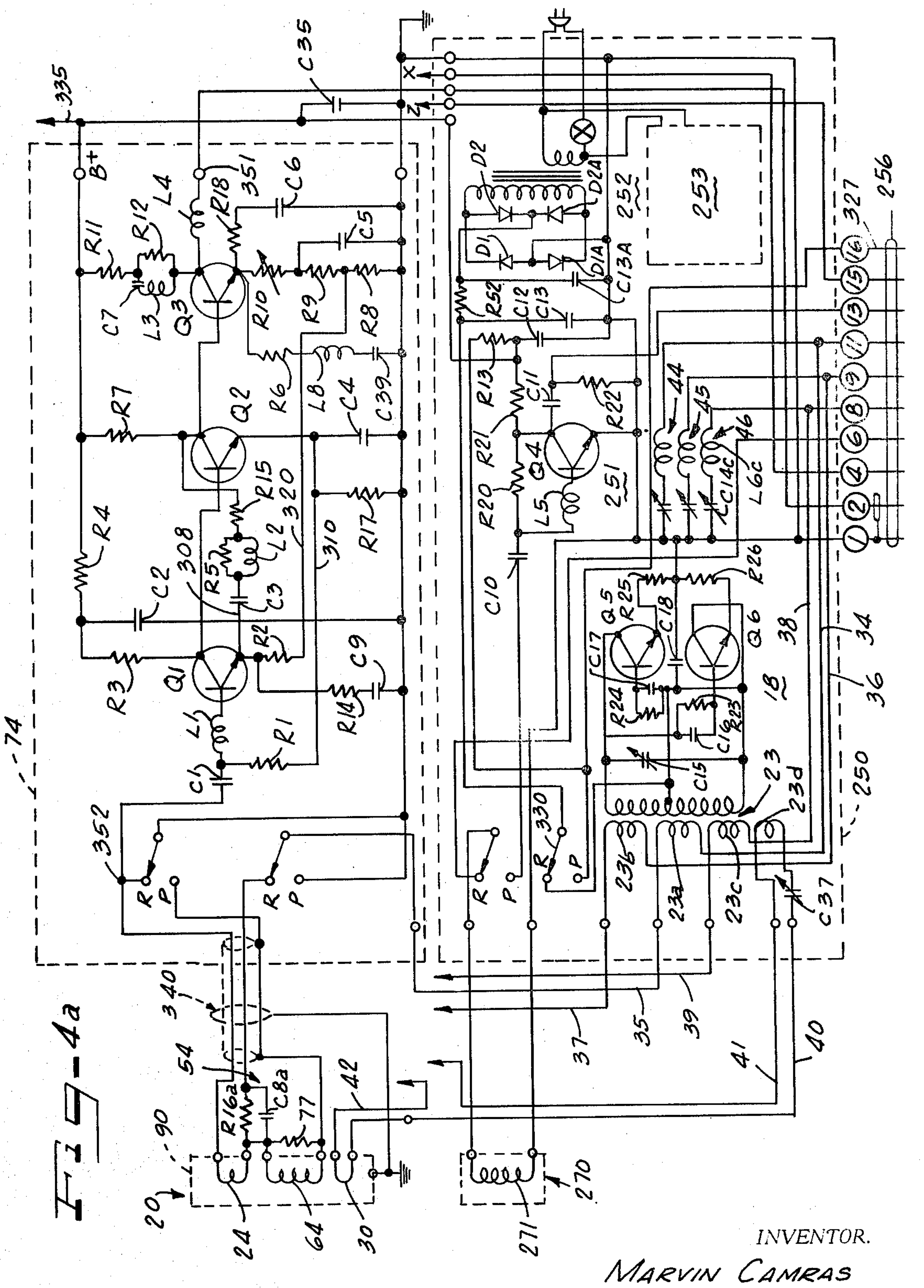
Figure 4B:
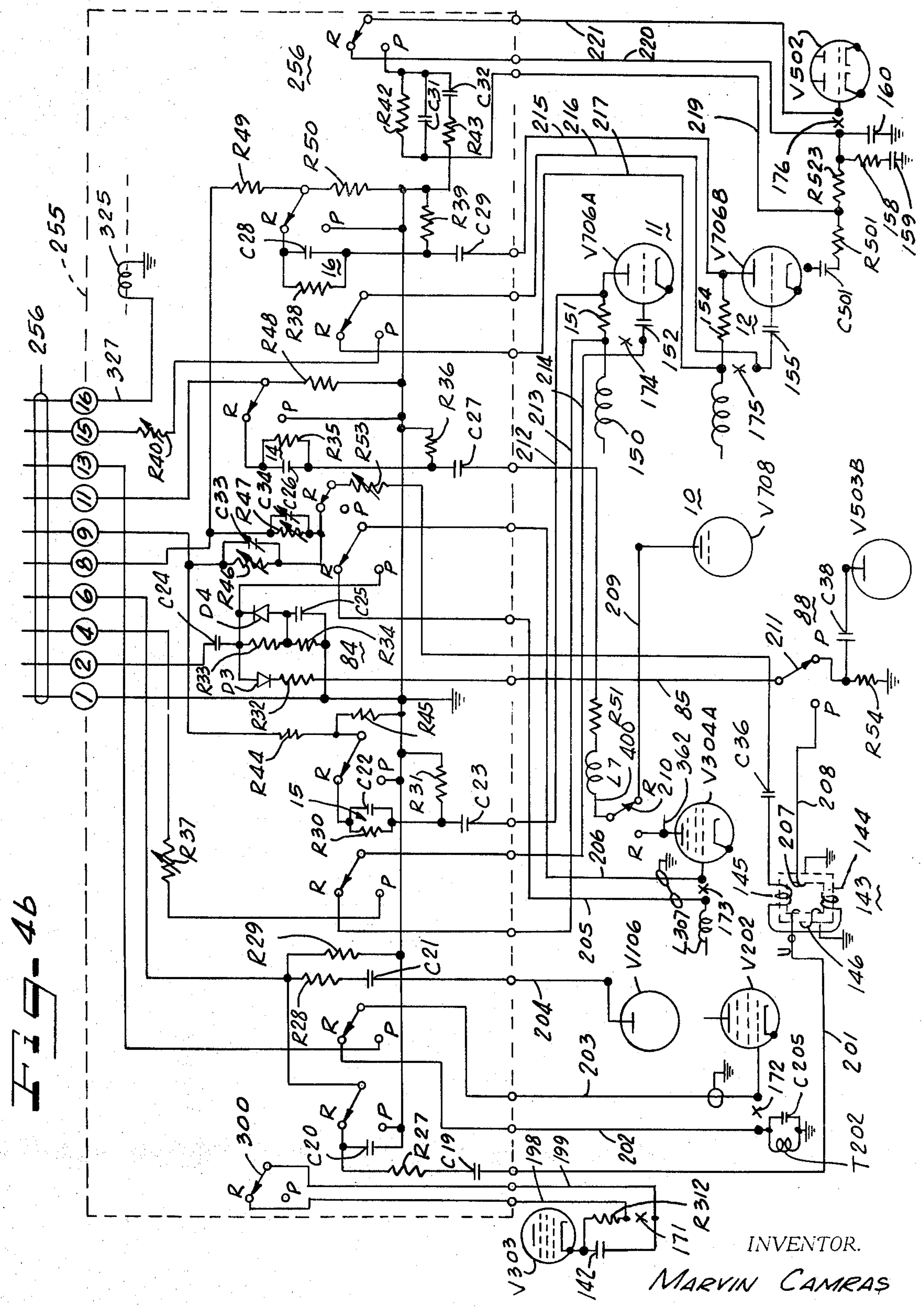
Figure 5:
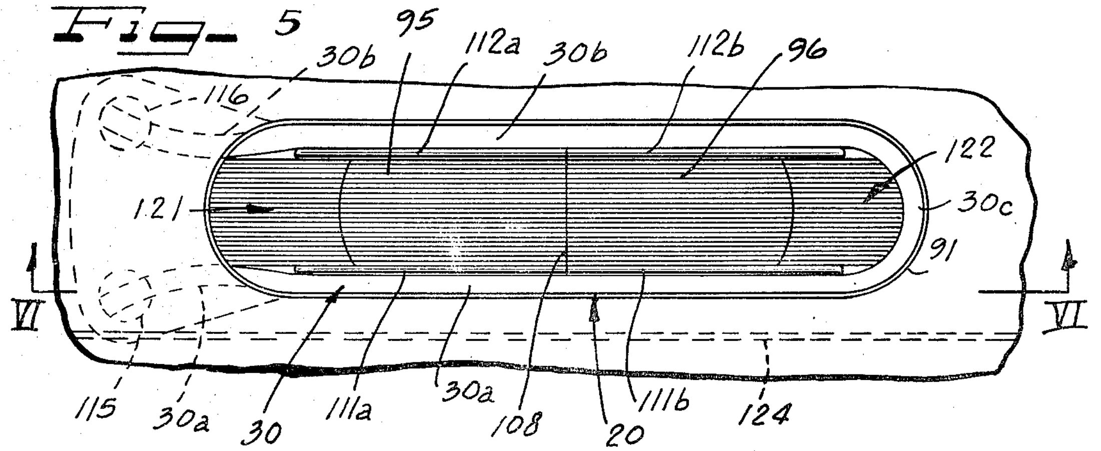
Figures 6, 7, 8, 9:
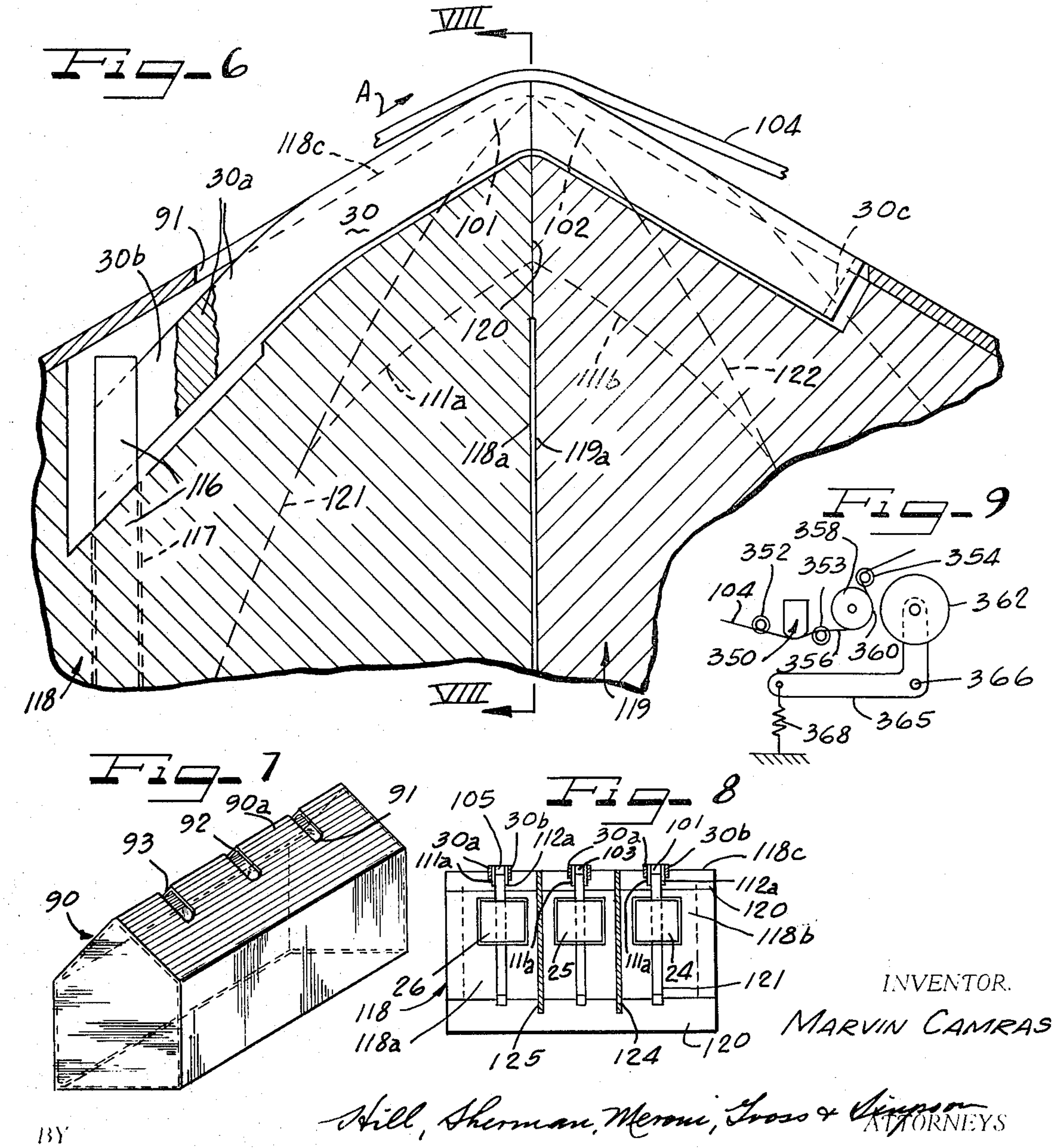
Figures 10, 11, 12, 13:
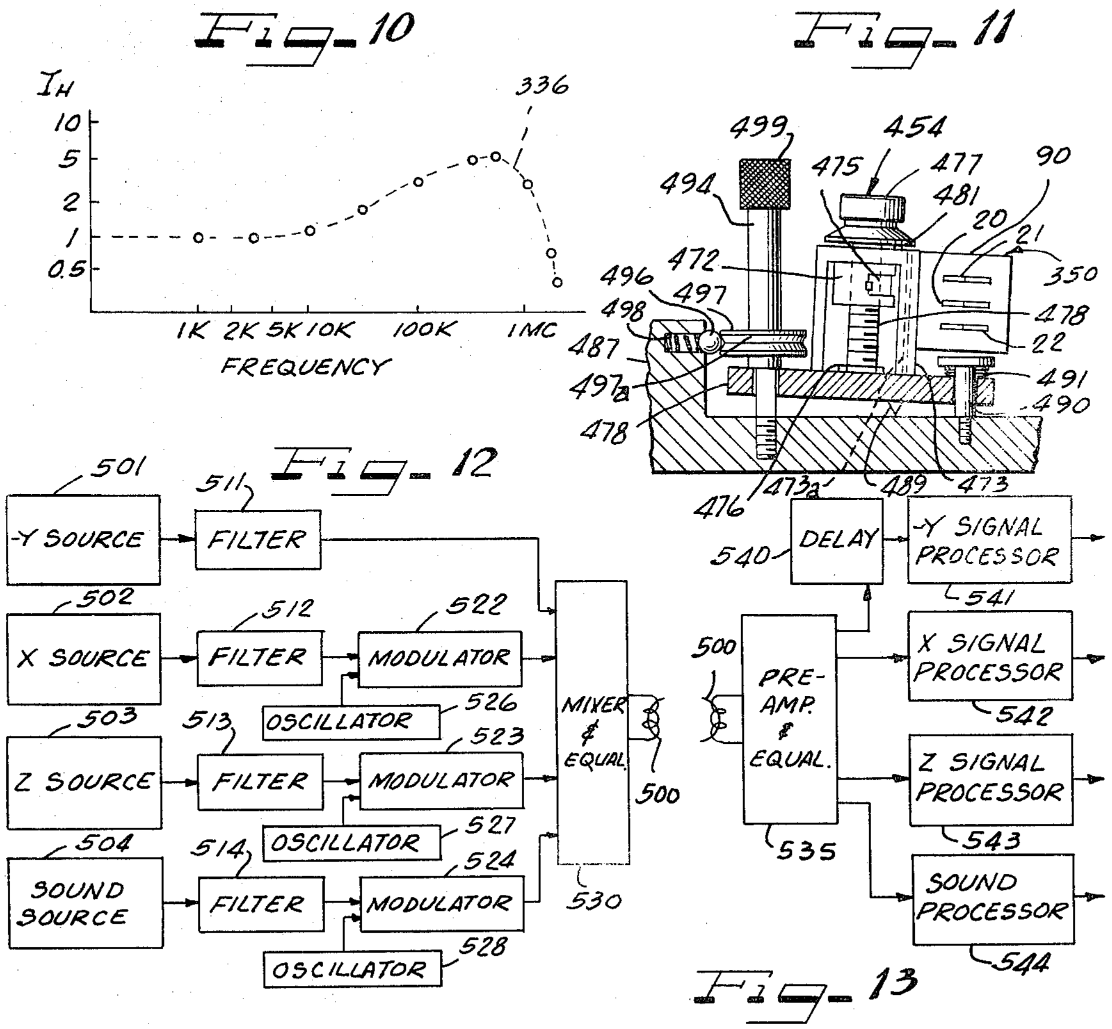
Figure 14:
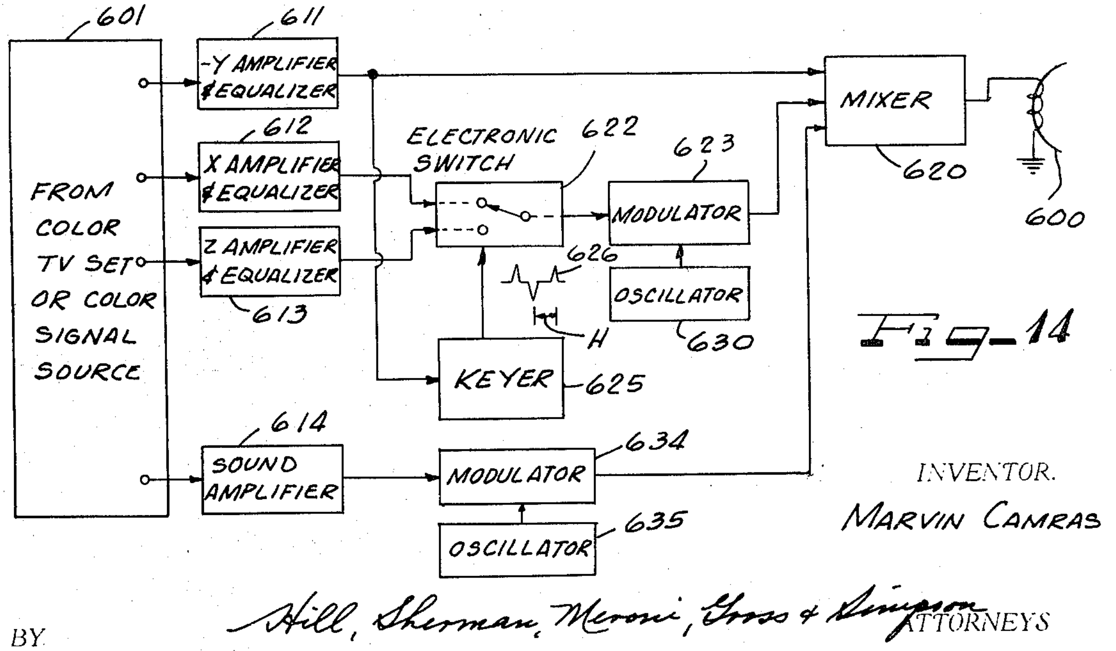
Figures 15, 16, 17, 18, 19:
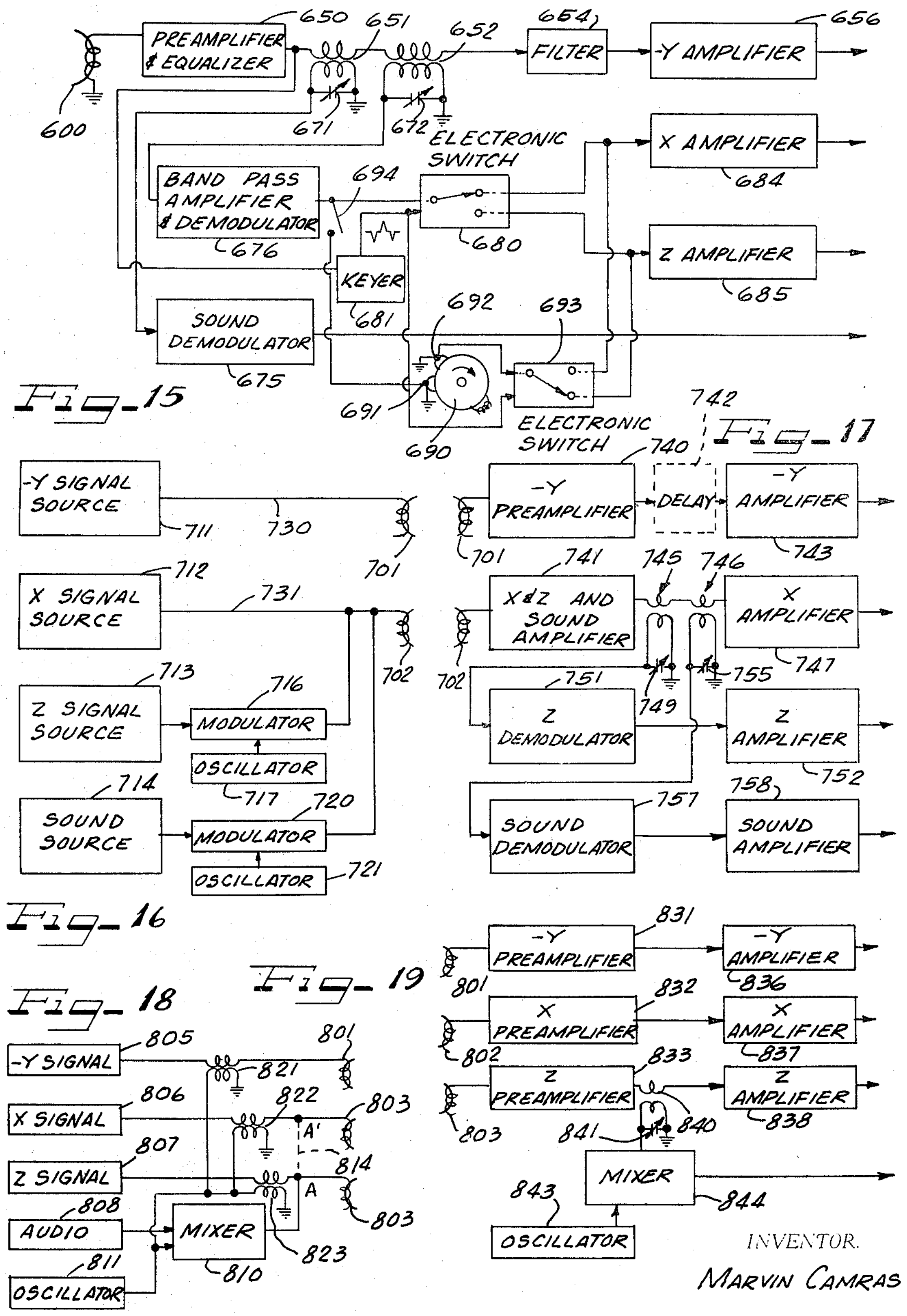

FIG. 4*a* is an electric circuit diagram showing portions of a preferred record-playback circuit in accordance with the present invention;

FIG. 4*b* is a circuit diagram showing further portions of a preferred record-playback circuit in accordance with the present invention, the circuitry of FIGS. 4*a* and 4*b* being connected by conductors of a cable indicated at the lower center of FIG. 4*a* and the top center of FIG. 4*b*;

FIG. 5 is a partial plan view of a preferred head assembly in accordance with the present invention;

FIG. 6 is a partial vertical sectional view taken substantially along the line VI—VI of FIG. 5;

FIG. 7 is a perspective view of the housing for the head assembly of FIGS. 5 and 6;

FIG. 8 is a somewhat diagrammatic transverse sectional view illustrating a sub-assembly of the head construction of FIGS. 5 and 6;

FIG. 9 is a somewhat diagrammatic plan view of a preferred tape transport arrangement for the system of the present invention, the capstan pressure roll being indicated in its retracted position;

FIG. 10 is a plot of recording head current as a function of frequency for constant input voltage to the grid of the first video amplifier stage;

FIG. 11 is a somewhat diagrammatic vertical sectional view illustrating a preferred head mounting assembly in accordance with the present invention;

FIGS. 12 and 13 illustrate a single channel recording system and a corresponding single channel playback system, respectively;

FIGS. 14 and 15 illustrate another form of single channel recording system and single channel playback system, respectively, employing switching means for interleaving alternate lines of two demodulated color signals;

FIGS. 16 and 17 show a two channel recording system and a two channel playback system, respectively, in accordance with the present invention; and FIGS. 18 and 19 illustrate a three channel recording system and a three channel playback system, respectively, in accordance with the present invention.

Figure 1:
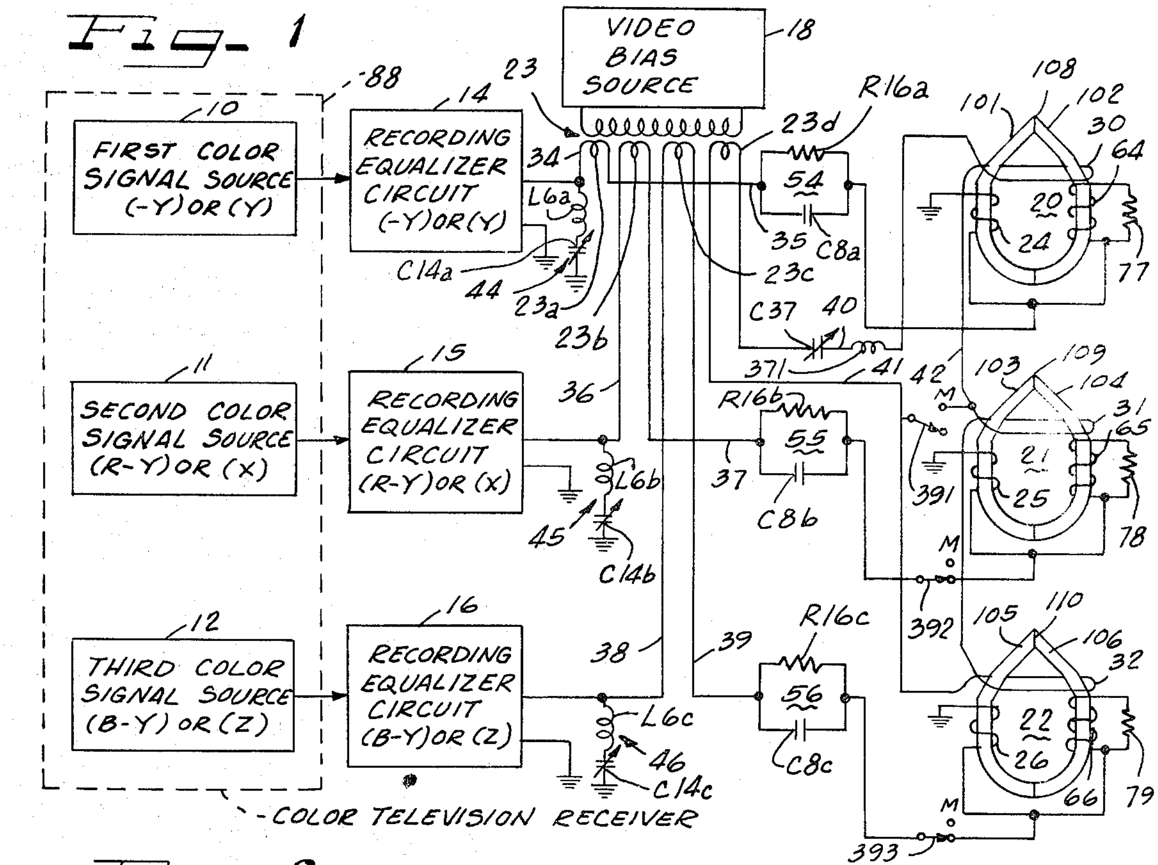
FIG. 1 is a diagrammatic view indicating a preferred color television recording system in accordance with the present invention.

FIG. 1 illustrates in diagrammatic form a preferred color television recording system in accordance with the present invention. In this preferred system, demodulated color signals are obtained from suitable sources such as indicated at 10, 11 and 12. In one type of commercial broadcast receiver, as for example the RCA CTC16XH chassis, demodulated signals known as the minus Y (—Y) signal, the R minus Y (R—Y) signal and the B minus Y (B—Y) signal may be obtained, respectively, from the plate of a third video amplifier tube, from the plate of a R minus Y amplifier tube and from the plate of a B minus Y amplifier tube. In general the (—Y) signal may be obtained from the cathode drive of commonly used three green color picture kinescopes, the (R—Y) signal from the red grid drive, and the (B—Y) signal from the blue grid drive. Alternatively the undelayed (—Y) signal is obtained from the first video amplifier. Alternatively, suitable demodulated color components known as the Y signal, the X signal and the Z signal may be obtained from the grids of the monochrome amplifier and color amplifier tubes respectively, and the color signal sources 10, 11 and 12 may represent suitable sources of these signals in such receiver circuitry, as another example. The term "color television signal" as utilized herein refers to a signal which may be utilized in reconstructing a color image without regard to whether the signal represents the actual variation of intensity of a particular color component of a light image. Thus, the term "-color television signal" as utilized herein comprehends the conventional Y or (—Y) signal which is found in present receiver circuitry.

Recording circuitry components 14–16 may comprise suitable equalizer circuits and optionally may include amplification circuitry.

In the preferred circuit arrangement, a component 18 is included for supplying a high frequency bias current to the respective head units indicated at 20, 21 and 22. By way of specific example, the source 18 has been indicated as energizing a transformer 23 which has respective secondary windings 23*a*, 23*b* and 23*c* interposed in series between the respective recording circuits 14–16 and the respective record windings 24, 25 and 26 of the head units. The video bias source 18 is also illustrated as energizing cross field conductors 30, 31 and 32 in series by means of a secondary winding 23*d*.

In order to conveniently correlate the showing of FIG. 1 with the detailed circuit diagram of FIGS. 4*a* and 4*b*, conductors in FIGS. 4a and 4b corresponding to conductors 34–42 in FIG. 1 will be given corresponding reference numerals. To further facilitate a comparison of these figures, an adjustable capacitor C37 and bias frequency trapping circuits 44–46 have been indicated in FIG. 1 and have been given corresponding reference numerals in FIG. 4a. Similarly coupling circuits 54–56 have been indicated in FIG. 1 and the coupling circuit for the Y channel has been correspondingly designated in FIG. 4a. Thus, the details represented at 18, 23, 30–32, 43–46 and 54–56 are included in FIG. 1 solely for the purpose of correlation with the preferred system of FIGS. 4*a* and 4*b*, and these details are, of course, not necessary to the broad concepts of the present invention. Other modifications not falling within the scope of the embodiment illustrated in FIG. 1 will be described hereinafter.

Figures 2, 3:
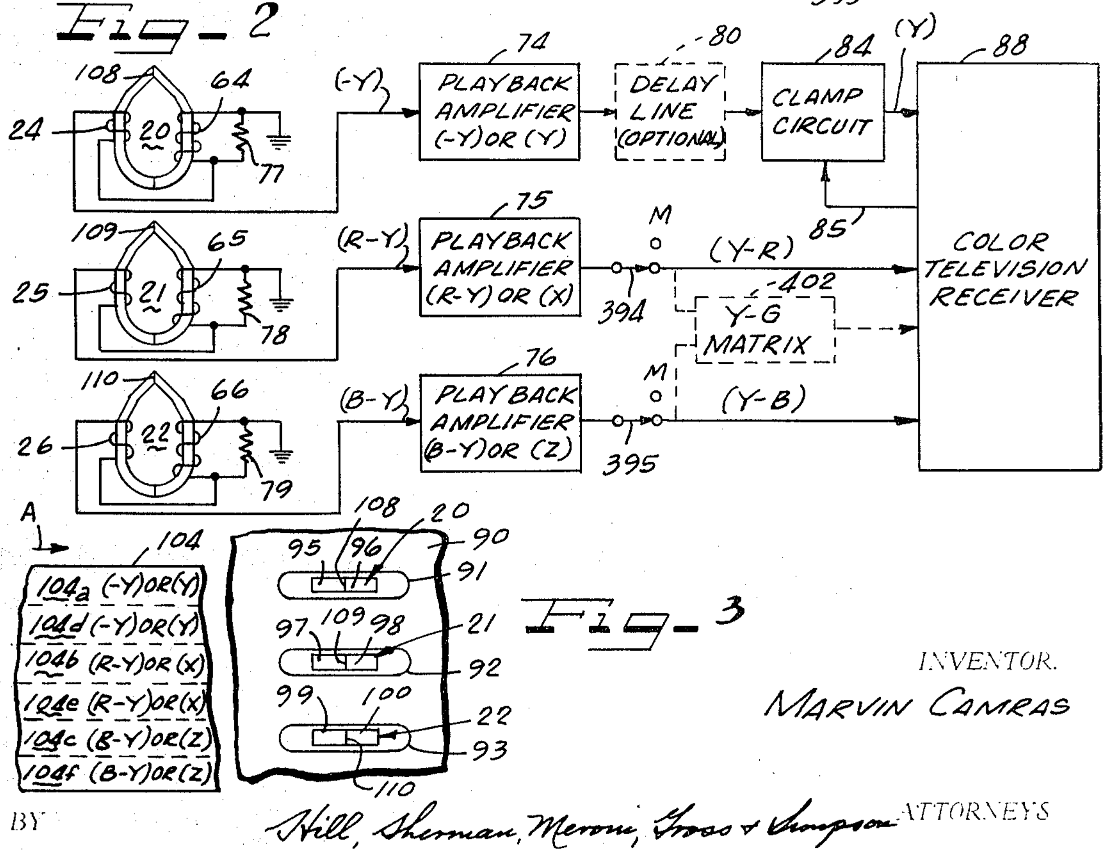
FIG. 2 is a diagrammatic illustration of a preferred color television playback system in accordance with the present invention.
FIG. 3 is a diagrammatic partial plan view illustrating a preferred transducer system for recording and playback of color television signals.

FIG. 2 illustrates a preferred playback arrangement including head units 20–22 which are identical to the head units of FIG. 1. During playback, the low impedance windings 24–26 are connected in series with high impedance windings 64–66 to supply respective reproduced signals to playback amplifiers 74–76. Resistors 77–79 are connected in parallel with the high impedance windings 64–66 and are for the purpose of dampening any resonance effects in the high impedance coil associated therewith. The input impedance of components 74, 75, 76 are designed to further damp the resonances in heads 20, 21, and 22.

As indicated in FIG. 2, the reproduced signals may represent respective demodulated color signal components such as a (—Y) component, a R minus Y component and a B minus Y component or may represent Y, X and Z components as previously mentioned, for example. A delay line component 80 may be optionally provided in the Y channel, the delay line in the monochrome portion of the broadcast receiver being conveniently used. The three color component signals may be supplied to suitable points in a conventional color television receiver circuit, for example to the grid of a first video amplifier tube, to the grid of a R minus Y amplifier tube and to the grid of a B minus Y amplifier tube, respectively, where these are the signals normally present in such receiver circuitry. In the RCA CTC16XH the delay line in the monochrome circuit may be bypassed by supplying the (—Y) playback signal to the third video amplifier V708, and similarly the delay line may be bypassed in other receivers.

For convenience in correlating FIG. 2 with the detailed circuitry of FIGS. 4*a* and 4*b*, a clamp circuit has been indicated at 84 in FIG. 2 and the specific clamp circuit shown in FIG. 4*b* has been designated by the same reference numeral. To conform with FIG. 4*b*, a pulse input to the clamp circuit 84 at the horizontal line frequency is represented as being supplied by a line 85 in FIG. 2 conforming with the showing for line 85 in FIG. 4*b*. The component designated by reference numeral 88 in FIG. 2 represents commercial broadcast receiver circuitry suitably modified so as to receive reproduced signals from the other components of the system of FIG. 2. Suitable modifications of one type of commercially available receiver using the RCA CTC16XH circuits have been indicated in detail in FIG. 4*b*. As with the embodiment of FIG. 1, the embodiment illustrated in FIG. 2 is not intended to comprehend all modifications falling within the scope of the concepts of the present invention, certain components having been indicated, such as the disclosure of particular preferred head units and a preferred clamp circuit 84, for the purpose of facilitating disclosure of a preferred embodiment in conjunction with the detailed circuitry of FIGS. 4*a* and 4*b*. Modifications in the playback circuitry of FIG. 2 will generally correspond to modifications of the recording circuitry of FIG. 1. All such modifications of FIGS. 1 and 2 may be integrated into a combined recording and playback system, one preferred embodiment of which having been disclosed in FIGS. 4*a* and 4*b*. To illustrate this point, color component sources 10, 11 and 12 have been shown as contained within a dash rectangle 88 corresponding to the modified receiver circuitry 88 of FIG. 2. Broadly, however, the concepts of the present invention are not limited to the use or adaptation of conventional broadcast receiver circuitry, since any suitable source of color signal components may supply the signal to be recorded, and the reproduced color component signals may be supplied to any desired display or other utilization circuitry. Further, many features of the present invention are applicable to black and white television signal transducing, to other color systems, and to the transducing of wide band signals generally. Many uses and modifications have been discussed in the aforementioned copending applications and these discussions are specifically incorporated herein by reference with respect to the disclosure of FIGS. 1 and 2.

While numerous suitable head configurations have been described in the aforementioned copending applications, a preferred head configuration is illustrated in FIGS. 3–8 taken in connection with the diagrammatic showings of FIGS. 1 and 2. A housing 90 of magnetic shielding material may substantially completely enclose the head units 20–22, the tape engaging surface 90*a* of the housing having three elongated openings 91, 92 and 93. FIG. 7 for receiving the tape engaging pole faces 95–96, 97–98 and 99–100 (FIG. 3) of the respective head units 20, 21 and 22. The poles 101–102, 103–104 and 105–106 of (FIG. 1) of the head units providing the tape engaging surfaces 95–100 have transversely aligned transducing gaps 108–110 therebetween for coupling of the respective head units with a tape record medium such as indicated at 104.

Each of the cross field conductors 30–32 may extend in a loop about the poles of the respective head units 20–22 as indicated in FIG. 5 for the conductor 30. Specifically it will be observed that the conductor 30 includes a first length portion 30*a* extending generally parallel to the direction of tape movement and directly adjacent the tape engaging polar faces 95 and 96 at one side of the head unit 20. A second length portion 30*b* of conductor 30 is connected with the conductor 30a by a reverse bend portion 30*c* and extends along the opposite side of the head unit 20 directly adjacent the tape engaging faces 95 and 96. As indicated in FIG. 6, each of the length portions 30*a* and 30*b* may generally conform with the tape path across the head assembly so that the top edge of the conductor 30 is in sliding contact with the tape travelling along the tape path for a substantial distance as shown in FIG. 6. The polar faces 95 and 96 are in sliding contact with the magnetizable surface of the tape as it travels across the head assembly, over the same distance as conductor 30. The side clearance between the poles 95, 96 and the high permeability casing 90 is quite narrow; being as small as 0.005 inch or less to give a good keeper action for isolation of adjacent channels. The conductor 30 is formed from thin ribbonlike material, and together with head core side support sections 111*a*, 111*b* and 112*a*, 112*b* and insulation fills the side clearance spaces between the core and housing.

As seen in FIGS. 5 and 6 the ends of the cross field conductor 30 may connect with vertical conductors such as indicated at 115 and 116 which extend on opposite sides of the magnetic core of head unit 20 and lead to terminals at the bottom of the housing. The conductors 115 and 116 may extend through passages such as indicated at 117 in the mounting block 118. The mounting block 118 together with a cooperating mounting block 119 are provided with mating surfaces such as indicated at 120 and 120*a* in FIG. 8 and with recessed portions such as indicated at 118*a* and 119*a* in FIG. 6. Each mounting block is also provided with suitable recesses such as indicated at 118*b* in FIG. 8 for receiving the windings 24–26. The mounting block 119 is, of course, provided with comparable recesses for receiving the windings 64–66 of FIG. 1. The mounting blocks also are provided with suitable recesses for receiving the respective core halves such as indicated at 121 and 122 in FIGS. 5, 6 and 8. The paths of the conductors such as 115 and 116 are of course, arranged so as to be clear of the core halves such as 121 and clear of the windings such as 24. The conductive parts such as 115 and 116 as well as the cross field conductors such as 30 are suitably insulated from the mounting blocks such as 118 and 119 where such blocks are of electrically conductive material. The cross field conductors are also suitably insulated from the housing part 90 where necessary.

Referring to FIG. 6, it will be noted that the cross field conductor part 30*a* and the core half 121 have been broken away to show the conductor part 30*b* extending into a receiving slot in the end of conductor 116. The configurations of core halfs 121 and 122 are preferably symmetrical.

Preferably shield plates are located as indicated at 124 and 125 for magnetically isolating the successive head units 20–22. The shield plates are preferably of magnetically soft high permeability magnetic material.

As seen in FIG. 8, the individual core halves such as 121 together with the associated cross field conductor such as 30 and the side plate sections such as 111*a* and 112*a* project slightly above the upper surface such as indicated at 118*c* of each of the mounting blocks so as to project into the openings 91–93 of the housing 90 with the upper surfaces of the core parts lying flush with the keeper surface 90*a* as illustrated in FIG. 6.

By way of a specific example, the head unit 20 may be located between the head units 21 and 22 (rather than as actually shown in the drawings), and the magnetic core of head unit 20 may have a width of 30 mils (1 mil equals 0.001 inch). The cores of the head units 21 and 22 may have a width of 21 mils. The overall width of the head unit 20 including the cross field conductor 30 and the side plate sections 111*a*, 111*b*, 112*a*, 112*b* together with suitable insulation may be 50 mils while the corresponding dimension of the head units 21 and 22 may be 41 mils. The center to center spacing between the successive head units may be 88.5 mils and the shield plates such as 124 and 125 may have a thickness of 6 mils. The side plate sections such as 111*a*, 111*b*, 112*a*, 112*b* may be of beryllium copper and have a thickness of 5 mils each. The cross field ribbons such as 30 may have a thickness of 5 mils each.

The bias frequency from source 18 may be in the range of 2.4 to 3.2 megacycles per second, for example 2.8 megacycles per second or from 4 to 4.4 MC for example 4.2 MC, in which frequency ranges the heads are efficient and the exact bias frequency signal adjustable by C15 does not interfere with the color or the sound circuits in the receiver. To further prevent such interference trap circuits 44–46, FIG. 4*a* are used. Good results may be obtained with a bias frequency of 3 megacycles per second or a bias frequency of 4 megacycles per second. Higher bias frequencies above 4.6 MC are usable, but require efficient heads as the X-field type. With this foregoing specific example, it will be understood that the channels of the tape 104 as viewed in FIG. 3 will have different signals recorded thereon. For example channels 104*a* and 104*d* would have the (R–Y) or (X) signal, the channels 104*b* and 104*e* would have the (minus Y) or (Y) signal and the channels 104*c* and 104*f* would have the (B minus Y) or (Z) signal recorded thereon.

The audio head unit or units such as indicated at 270 in FIG. 4*a* may be located as specifically indicated in the second figure of my copending application Ser. No. 439,340, and the audio head unit configuration may be as illustrated in the fourth or fifth figures of said application Ser. 439,340.

With the specific arrangement just described where the monochrome head unit 20 is wider than and between the head units 21 and 22, stereophonic audio signals would be recorded in channels 104*a*, 104*c* and 104*d*, 104*f* just as represented in channels R1, R2 and B1, B2 of the fourth figure of my copending application Ser. No. 439,340, except that the fourth figure happens to illustrate nine channels rather than six channels as in FIG. 3. Specifically referring to FIG. 3, the video tracks would be recorded in an upper part of channels 104*a* and 104*c*, for example, while the audio tracks would be in channels 104*a* and 104*c* but below the video tracks.

For simplicity, the head units 20–22 may have the same width as actually illustrated in the drawings, so record tracks on the record medium 104 of equal width. As indicated in FIG. 3, the head units 20, 21 and 22 may be spaced apart in the lateral direction by multiples of the channel width so that the upper set of alternate channels 104*a*–104*c* receive signals (minus Y), (R minus Y) and (B minus Y) respectively as the tape 104 travels in the direction of arrow A, and the lower set of alternate channels 104*d*–104*f* receive signals (minus Y), (R minus Y) and (B minus Y) as the tape moves in the opposite direction.

Alternatively the audio signal or signals may be recorded as modulation on one or two of the signal tracks, preferably on the (R minus Y) and (B minus Y) signal tracks which have excess bandwidth beyond the requirements of the color information. Frequency modulation, phase modulation or amplitude modulation may be used as described in my pending application Ser. No. 393,282. Heterodyning the 4.5 megacycle per second sound carrier of a broadcast signal so that it is within the recording range of the tape system is a simple method which makes use of existing circuits in the receiver.

For other video head constructions and further details, reference is particularly made to my copending applications Ser. 407,402 filed Oct. 29, 1964 and Ser. No. 439,340 filed Mar. 12, 1965, and the disclosures of these two applications with respect to video head constructions is specifically incorporated herein by reference.

An explanation of the cross field recording principle which is applicable to the preferred head construction is found in an article entitled "An X-Field Micro Gap Head For High Density Magnetic Recording" by Marvin Camras in *IEEE Transactions On Audio*, Volume AU–12, May–June, 1964, pages 41–52. Further explanation of preferred details is found in the aforementioned copending applications and this disclosure is incorporated herein by reference.

DESCRIPTION OF THE SPECIFIC CIRCUITRY OF FIGS. 4*a* AND 4*b*

The general arrangement of the detailed circuitry of FIGS. 4*a* and 4*b* will be apparent from a comparison with FIGS. 1 and 2 since in FIGS. 4a and 4b reference numerals such as 10, 11, 12, 14, 15, 16, 18, 23, 24, 30, 34–46, 54, 64, 74, 77, 84, 85 and 88 have been located so as to indicate specific circuit elements corresponding to those represented in FIGS. 1 and 2.

For purposes of specific illustration, the components in the region 88 are in general conventional components of RCA Model CTC16XH color television chassis. This circuit is representative of color TV circuits that are widely used. The conventional networks and individual components shown in FIG. 4*b* are tabulated as follows: tube V303 (type 6EJ7), capacitor 142, resistor R312, inductor T202, capacitor C205, sound demodulator tube V202 (type 6HZ6), audio output tube V106 (type 6AQ5A), inductor L307, first video tube V304A (type 6LF8), horizontal output transformer 143, horizontal output winding sections 144, 145 and 146, tube V503B, third video tube V708 (type 12BY7A), inductor 150, resistor 151, capacitor 152, (R minus Y) amplifier tube V706A (type 6GU7), inductor 153, resistor 154, capacitor 155, (B minus Y) amplifier tube V706B (type 6GU7), capacitor C501, resistor R501, resistor R523, resistor 158, capacitor 159, capacitor 160, tube V502.

The following components within the general region of the receiver circuit 88 are new components having values as follows: inductor L7—500 microhenries, resistor R51—4,700 ohms, capacitor C36—1,000 micromicrofarads, resistor R54—47,000 ohms and capacitor C38—15 micromicrofarads.

The original circuit has been broken in a number of points as will be apparent to those skilled in the art, for example at the locations indicated by a small "*x*" and designated by reference numerals 171–176. At other places in FIG. 4*b*, tube elements, circuit componets and conductive connections have simply been omitted for the sake of simplicity since such elements remain unchanged from the standard circuit.

Connections or additions to the standard RCA chassis comprise conductors 198 and 199, the conductor 201 connected to terminal U of the winding section 146 of the horizontal output transformer 143, conductors 202–206, a single turn winding 207 on the horizontal output transformer 143 together with a conductor 208 for coupling with conductor 85 and the clamp circuit 84 shown in FIG. 2, conductor 209 and switch 210 providing selective (minus Y) output from the plate of tube V304A or V708, inductor L7 and resistor R51, capacitor C36 connected to terminal No. 3 of winding section 145 of the horizontal output transformer, switch 211 providing in a left hand position coupling between conductor 208 and conductor 85 and in the illustrated right hand position connecting conductor 85 with the plate of tube V503B through capacitor C38 and conductors 212–221.

The top rectangle in FIG. 4*a* is designated by the reference numeral 74 since the circuit elements therein represent a preferred playback amplifier for the (minus Y) channel. The playback amplifier components 75 and 76 of FIG. 2 may utilize circuitry similar to that shown for component 74 in FIG. 4*a*.

The components in the lower dash line rectangle 250 in FIG. 4*a* include preferred circuitry for the video bias component 18 as well as the bias frequency trapping networks 44–46, an audio playback amplifier circuit 251 and a power supply circuit 252. A tape transport control circuit is indicated by a dash rectangle 253 which may correspond to that shown in the seventeenth figure of my copending application Ser. No. 493,271. In an actual embodiment of the present invention, however, supply and take-up reel motors are used with special torque rotors to provide drag on the supply spindle depending on the direction of tape travel, instead of the half wave rectifier and variable resistor which provide direct current drag in my previous disclosure.

The circuitry in the dash line rectangle 255 in FIG. 4*b* may be termed the adaptor or coupling circuitry and consists of a junction box that receives a cable indicated at 256 from the recorder unit (represented by block 250 in FIG. 4*a*) and contains circuitry that is best located at the television receiver to minimize undesirable capacitance or stray coupling, and to simplify the cable connections. In other words, the adaptor circuit 255 is physically disposed closely adjacent to the conventional video circuit components indicated in the lower part of FIG. 4*b*.

The adaptor circuitry 255 includes preferred circuit elements for the equalizing circuits 14–16 of FIG. 1, and these circuits have been designated by the corresponding reference numerals to indicate this fact. Also included is preferred circuitry for the clamp circuit 84 of FIG. 2 and accordingly the reference numeral 84 has been applied in FIG. 4*b*. A stabilizing circuit 256 is indicated at the lower right of the box 255 and is associated with the horizontal control circuit of the receiver circuitry including elements C501, R501, R523 and 158–160.

A single channel audio transducer head is diagrammatically indicated at 270 in FIG. 4a and is shown as including a winding 271. This audio head unit may correspond to that illustrated in the fifth figure of my copending application Ser. No. 439,340, the description of which is incorporated herein by reference.

The operation of the video head units such as indicated at 20 in FIG. 4*a* in relation to the other circuitry of FIG. 4*a* will be readily understood by a consideration of the disclosure of my copending application Ser. No. 493,271.

The overall function and operation of the circuitry of FIGS. 4*a* and 4*b* will in general be apparent from the foregoing description and from the disclosures of my aforementioned copending applications. Certain significant features of the illustrated circuitry will now be referred to in detail.

Referring to FIG. 4*b*, resistors R37 and R40 in the circuit coupling the color playback preamplifiers to the R–Y and B–Y amplifiers in the TV set (in the adaptor circuit 255) set the clamping levels of the (R minus Y) and (B minus Y) amplifiers V706A and V706B, respectively, by loading the grid circuits and thus determining the grid currents that flow as a result of pulses in the cathode circuits of the amplifier tubes V706A and V706B. The pulses are fed from the plate of a tube V707B of the conventional chassis to the cathodes of tubes V706A and V706B. Resistors R37 and R40 may be adjustable with values of 8,200 and 10,000 ohms, respectively, having been found to give a white background when no color picture is present. Without these resistors the playback color balance is seriously upset.

During recording, negative pulses from terminal 3 of the winding indicated at 145 of the horizontal output transformer are fed to the recording head circuit through series capacitor C36, series resistor R53 and RC networks R46, C33 and R47, C34. These networks shape the negative current pulses from the horizontal output transformer so that they effectively neutralize similar pulses from the output of the color amplifier tubes V706A and V706B. If the latter pulses are not cancelled they will be recorded as part of the color signal, and upon playback these pulses will upset the operating levels of the color circuits, giving incorrect color rendition. Also the presence of these unnecessary pulses tends to limit the recording levels or to overload the magnetic record tape. Alternatively it is possible to counteract during playback the effects of the color signal pulses if these are not neutralized. This may be done by applying a corrective bias to the grid or plate circuit of tubes V706A and V706B or the grids of the picture tube. It is preferable, however, to record the color signals without their blanking-interval pulses, or with these pulses greatly reduced, and this mode of operation has been illustrated in FIG. 4*b*.

Switch 300 in the adaptor circuitry 255 is in series with cathode resistor R312 of tube V303 and renders this IF stage inoperative during playback to prevent feedthrough of broadcast signals from interferring with the tape playback operation.

Inductor L7 and resistor R51 in the receiver circuitry 88 of FIG. 4*b* reduce loading of the television signal circuits by the connection to the recording head circuit, reduces interference from the high frequency bias circuit, and serves to increase the amplitude of the high frequency components of head energizing current because of a series resonance effect with the video head circuit capacitance. Resistors R44 and R49 in the adaptor circuit 255 similarly serve in the (R minus Y) and (B minus Y) head circuits leading to head units 21 and 22, respectively.

Switch 210 in the receiver circuitry 88 alternatively connects the (minus Y) recording head circuit either to the plate of the first video tube V304A or the plate of the third video tube V708. Thus, with the switch 210 in the position shown, a delay line is included in the circuit so that the (minus Y) signal is retarded with respect to the signal at V304A. The recording level and response may be varied by the brightness and contrast controls on the receiver when the connection is to V708; but is not dependent on these controls when the connection to V304A is used.

In FIG. 4*a*, power supply circuit 252 includes a bridge circuit giving an output voltage of 35 volts to the bias frequency oscillator circuit 18.

The circuitry of FIGS. 4*a* and 4*b* is converted from the recording mode illustrated to the playback mode by shifting the record-play selector switches from the "R" to the "P" positions. In playback mode the two video windings of each video head unit such as windings 24 and 64 are connected in series with each other with the phases of the voltages induced therein either in phase or 180° out of phase. A series opposing relation has been disclosed and described in detail in my aforementioned copending application including Ser. 493,271 and is specifically shown in FIG. 2. In this case, the overall circuitry is arranged to provide an improved response characteristic taking advantage of the fact that the high impedance windings such as 64 are resonant at a relatively lower frequency such as at about 250 kilocycles per second while the low-turns windings such as 24 are resonant at a much higher frequency such as at about two megacycles per second. The two video windings of each video head unit in series complement each other thereby extending the total frequency response.

With the series opposing relationship between windings 24 and 64, during playback at low frequencies the output of winding 24 subtracts from the output of winding 64 reducing the output of winding 64 by perhaps 20 percent, which is not significant. At frequencies above resonance of the high turns winding 64, the output of this winding reverses in phase and aids the output of winding 24. At still higher frequencies above the resonance of winding 24, the output of winding 24 reverses phase and again is of opposite phase relative to the output of winding 64; however at these frequencies the output of winding 64 is insignificant.

The phase shift in the playback amplifier such as 74 associated with the windings 24 and 64 is the reverse of that of the combined windings (as a function of frequency) so that an overall smooth phase characteristic (constant time delay) as a function of frequency results at the output of the amplifier 74, except at the very lowest and highest portions of the spectrum. Thus, the overall effect of the recording and playback system of FIGS. 1 and 2 is to produce at the output of the playback amplifiers 74–76 color video signal components having essentially the same phase relationship as the component signals supplied by the sources 10–12. Further the frequency components of each color component signal such as the signal supplied by playback amplifier 74 have the same phase relationships as the corresponding frequency components of the original signal such as the one supplied from signal source 10.

The response of the playback amplifiers as a function of frequency is purposely made to drop rapidly at frequencies below about 300 to 600 cycles per second in order to reduce hum and low frequency transistor noise, giving important economies since it is not necessary to use elaborate shielding or expensive low-noise transistors in the playback amplifier circuitry. It has been found that boost in amplitude response as a function of frequency of perhaps 3 decibels to 10 decibels at frequencies above the low frequency cut-off, for example a boost in the frequency range from 600 cycles per second to 3,000 cycles per second, is beneficial in giving a smooth time delay characteristic at low frequencies, that is in giving a relatively constant time delay over the entire useful video range when this feature is used with the transducers and circuitry as described.

The pedestal setting or clamping circuit including capacitor C24, resistor R32, resistor R33, resistor R34, capacitor C25 and diodes D3 and D4 further removes hum components, sets the sync pulses at the correct level, and biases the video amplifier V304A in the television set to the proper operating value.

It will be understood that during playback of a recorded video signal, the reproduced signal will be supplied to the grid of amplifier tube V304A, and that the plate of the tube V304A is coupled by means of a connection such as indicated at 362 to succeeding stages of video amplification via existing circuits. The color television receiver 88 of course includes an image reproducing device such as a tri-color television tube.

At the highest frequencies of the effective bandwidth of the record-playback system, the playback amplifiers 74–76 provide adequate amplitude compensation in conjunction with the recording equalizer circuits 14–16, but phase compensation at these highest frequencies may not be exact. Such lack of exact phase compensation at the highest frequencies has been found to be very practical in an economical recorder, the result being a shift in fine structure of the image which is barely noticeable. It was previously considered that satisfactory compensation at these highest frequencies of the order of one megacycle per second and higher could only be accomplished with transmission lines or with complicated all-pass networks.

An overall response may be obtained in each video channel generally as indicated in the sixteen figure of my copending application Ser. No. 493,271. The high frequency response of 75 and 76 may be reduced by changes as indicated in the table of component values and elsewhere in this application. There the response was shown as extending to 2.2 megacycles per second at the high end from about 300 cycles per second at the low end. This may be termed the bandwidth of the amplifiers. However the pedestal setting circuit effectively extends this to d-c (direct current). The normal recording level was approximately 35 to 40 decibels above the broad band noise level. These characteristics are considered satisfactory for a low-cost, non-professional recording unit. The frequency response indicated in the sixteenth figure of the copending applications results in a playback picture image quality of acceptable level. It is found, however, that in the recording process a rising response or amplitude level of recording current as a function of the frequency with constant input to the video amplifier stage (V304A or V708, V706A and V706B) in the region from 10,000 cycles per second to 100 kilocycles per second is beneficial, and this rising response characteristic is provided by the recording circuits 14–16 for the respective video channels in the illustrated embodiment. This rising response characteristic for the recording circuits is indicated by curve 336 in FIG. 10.

With the transducer head units of the type illustrated in FIGS. 5–8 a normal operating level of signal current of about 1.0 milliamperes peak-to-peak in the 200 turn winding such as 24 is satisfactory. Saturation begins at about 4 to 8 milliamperes. A bias current of about 12 milliamperes may be superimposed on the signal current in the head unit 20, and bias currents of about 20 milliamperes may be superimposed on the signal currents in the head units 21 and 22, where the bias frequency is about 2.8 megacycles per second. The exact frequency is adjusted by adjusting capacitor C15 to prevent interference with the television set circuits. The values of bias current of 12 milliamperes and 20 milliamperes at a frequency of about 2.8 megacycles per second may be utilized in the absence of any bias current to the bias windings 30–32.

When the cross field windings 30–32 are energized, a current in the range from 1 to 5 amperes r.m.s. at the bias oscillator frequency may be employed and the bias currents to windings 24–26 may be reduced to about half the values given above, and a higher bias frequency may be used as for example 4.2 megacycles per second to 4.4 megacycles per second, or a bias frequency above 4.6 megacycles per second may be used.

If the cross field windings 30–32 are not used, a lower bias frequency is required and the overall response is not as good.

In the illustrated embodiment as in the embodiment of my copending application Ser. No. 493,271, the recording level may be of the order of 8 to 10 decibels below tape saturation. The playback amplifier 74 and the similar amplifiers 75 and 76 are generally similar to the playback circuit shown in the eighteenth figure of my copending application Ser. No. 493,271. This circuit includes a negative feedback network as indicated at 308 between the first two stages of video amplification and serves to provide a phase shift compensating for the phase shift which occurs in the head response at and below the crossover region centering about the resonant frequency of the high impedance winding of each head unit such as the high impedance winding 64 of the head unit 20.

Referring to the ninth figure of my copending application Ser. No. 401,832, the negative feedback network 308 between the first two stages of video amplification in FIG. *4a* (together with C9 R14, C6 R18, (39 L8 R54 and L3 R12 C7) is designed to provide the phase correction in the curve designated 680 in the region designated by reference numeral 682. The phase shift as a function of frequency provided by the feedback network 308 which includes resistor R15, resistor R5 and inductor L2 in parallel and capacitor C3 together with the above mentioned networks compensates for the phase shift in head response in the region of resonance of the high impedance winding such as winding 64 for the head unit 20.

The maximum overall gain of the video amplifier circuit such as 74 varies between about 100 and 10,000 as a function of frequency. Actually the transistorized circuit shown herein and in the eighteenth figure of my copending application Ser. 493,271 gives greater high frequency response and higher gain than the vacuum tube circuit shown in the seventeenth figure of said copending application.

The difference in circuit constants as for example R15, L2, C3 in FIG. *4a* and in the corresponding circuit of Ser. 493,271 accounts for the deeper valley in response of the latter which drops to an amplification of only about 15 at 150KC to match a different head characteristic.

The high impedance windings 64–66 of the head units are loaded by resistor 77–79 but otherwise not connected during recording and become effective during playback, in the illustrated embodiment. These head windings 64–66 are shunted by resistors 77–79 to flatten the resonance response characteristic of each high impedance winding at the resonance frequency of this winding with respect to the associated circuit capacitance. The low impedance winding of each head unit, namely windings 24–26 of head units 20–22, (together with the associated high impedance winding) is damped by the input resistance of the first transistor Q1 which input resistance is comparable to the impedance of winding 24 at medium and high frequencies within the range of the system. The input impedance of transistor Q1 is determined by the networks connected to its emitter and varies with frequency. The two conductor double-shielded cable generally designated by the reference numeral 340 connects the head unit 20 to the input circuits and prevents hum and extraneous signal pick-up by the two conductors and inner shield within the cable.

Inductance L1 removes radio frequency pick-up of energy being broadcast from local transmitters which pick-up might otherwise overload the input circuits. Unless otherwise indicated, each of the features described herein with respect to the head unit 20 and its associated video amplifier 74 applies also to the head units 21 and 22 and their playback amplifier components 75 and 76.

The direct current operating points of the transistors Q1, Q2 and Q3 are stabilized by negative feedback to the emitter of transistor Q1 via circuit 320 leading to resistor R2, and by feedback via circuit 310 to the base of transistor Q1 through resistor R1. The high degree of feedback makes the circuits insensitive to variations in transistor characteristics, supply voltage, temperature, etc. The capacitor C5 by-passes the feedback network R8, R9 associated with feedback circuit 320 allowing the amplifier to have normal gain at operating frequencies above about 300 to 800 cycles per second while substantially reducing the overall amplifier gain at frequencies below about 300 to 800 cycles per second relative to such normal gain and thus reducing hum and instability. In the circuit specifically disclosed herein, capacitor C5 has a capacitance value of 250 microfarads. Lower values of capacitance for capacitor C5 in relation to the values of resistors R8 and R9, as for example 60 microfarads, will raise the frequency below which the amplification drops rapidly; and just above this higher cut-off frequency, the amplifier will exhibit a rather broad peaking of the response characteristic as a function of frequency. A rise in response of this kind constitutes a desirable feature from the standpoint of improving the transient and phase response, where the low frequencies are cut off.

The frequency and phase response of the playback amplifier 74 is shaped by the feedback circuit 308 including network R15, C3, R5 and L2, so as to give a strongly falling characteristic in the range from about 300 cycles per second to 100 kilocycles per second, the response peaking in the neighborhood of 600 cycles per second and then sharply falling (so far as the effect of feedback circuit 308 is concerned) until the frequency reaches a relatively low value at a frequency of 100 kilocycles per second. The effect of the feedback circuit 308 together with the effect of resistor R14 and capacitor C9 in the emitter circuit of transistor Q1, the effect of resistor R18 and capacitor C6 in the emitter circuit of transistor Q3, and the effect of the network consisting of resistor R12 and inductor L3 in the collector circuit of transistor Q3 gives an overall response characteristic to the amplifier 74 as a function of frequency which exhibits a very sharply rising response of increasing slope in the range above about 300 kilocycles per second to the upper limits of the system which upper limit may be in the range from 1.5 megacycles per second to 4.5 megacycles per second.

As previously described, when the windings such as 24 and 64 on the head unit 20 are connected in "-bucking" relation with respect to low frequencies, the phase of the induced voltage in winding 64 undergoes a reversal as a function of frequency as the frequency is increased through the resonance value for the winding 64, so that the induced voltage in winding 64 aids the induced voltage in winding 24 at high frequencies between the resonance frequency of winding 64 and the resonance frequency of winding 24. The amplifier frequency response and phase response is shaped to complement that of the head, giving smooth response, uniform delay, and a good transient response over the frequency spectrum of interest.

It has been found that an advantageous characteristic may also be obtained from a series aiding connection of a low impedance and a high impedance winding such as windings 24 and 64 of head unit 20 if certain criteria are met: (1) the resonant frequencies of the windings must be spaced properly; and (2) the resistive loading especially on the high impedance winding such as 64 must be enough so that phase reversal of the net output from the windings does not take place in the transition frequency spectrum where both windings are contributing substantially to the output.

If winding 64 is reversed to give series aiding operation, the phase of the output from the preamplifier 74 will be reversed. An additional stage of amplification will restore the correct phase, or other suitable change in the circuitry may be used.

Referring to FIG. **4*b*, the diodes D3 and D4 in the clamp circuit 84 are preferably of the silicon junction type having a very high resistance in the forward direction until the forward potential exceeds about 0.5 volt to 0.7 volt. This feature has been found very advantageous, as it allows a precise setting of the sync pedestal level and still permits the picture signal to make large excursions without clipping. An example of a preferred type for diodes D3 and D4 is the 1N463A. The one-turn loop 207 on the horizontal output transformer 143 of the television receiver provides negative pulses to the clamp circuit 84 in the left-hand position of switch 211. In the right-hand position of the switch 211, the horizontal sync pulses from the plate of the sync separator tube V503B are supplied to the clamp circuit 84. In either event, the magnitude of the pulses is about twelve volts peak (relative to ground). The clamp circuit 84 including diodes D3 and D4 sets the negative level of the output video signal from the playback amplifier 74 as well as providing a direct current bias for the video amplifier tube V304A in the television receiver 88. As indicated in FIG. 1, only one clamp circuit is provided in the recorder, and this is preferably associated with the output of the monochrome playback amplifier 74. With this arrangement, it will be apparent that the system of FIGS. 1 and 2 may be utilized to record and playback monochrome broadcast television signals as well as color signals. This takes place automatically when recording while the TV set is picking up a monochrome signal. By switching out the heads 21 and 22 during recording and playback, and setting the (−Y) head 20** to cover successive channels including those which would otherwise be used by the color signals, more recording time is obtained on a given roll of tape.

The flutter in the tape transport may cause deviations in the desired rate of the synchronizing pulses in the reproduced video signal. FIG. **4*b* indicates at 256 modifications in the horizontal control circuit (associated with tube V502**) of the television receiver. These modifications enable the horizontal sync circuits of the receiver to follow any deviations in the reproduced sync pulses.

As illustrated in FIGS. 4*a* and 4*b*, the audio winding 271 during recording may receive its audio signal current from the audio output tube V106 via capacitor C21 and resistor R28, while audio bias frequency current is supplied from the winding section 146 of the horizontal output transformer 143 through capacitor C19 and resistor R27.

During playback, the audio signal current induced in the winding 271 is supplied via capacitor C10 and inductor L5 to the base of a transistor Q4 which provides audio amplification. The output of the audio amplifier 251 is supplied via capacitor C11 to the grid of the sound demodulator tube V202 of the receiver circuitry 88. The "discriminator" tube V202 serves as an audio amplifier during tape playback. The transistor Q4 of the audio amplifier 251 may preferably be a type 2N3391A.

When the cable 256 is unplugged from the adaptor circuitry 255 the receiver circuitry 88 may be utilized independently of the circuitry of FIG. 4*a* to receive and display broadcast television signals. In this case, the switches of the adaptor circuitry 255 are placed in record mode. If the various switches are relay operated, their normal positions would be in the record mode, and unplugging of the cable 256 would deenergize the relay or relays to automatically place the adaptor circuitry 255 in the record mode. A suitable relay coil is indicated at 325 in FIG. 4*b*, and this relay coil is shown as being energized from the power supply 252, FIG. 4*a*, via conductor 327 of cable 256. The relay coil 325 preferably controls each of record-play selector switches, moving the switches from "R" to "P" position when energized. Simply by way of example when cable 255 is coupled to the adaptor 255, the relay 325 may be energized to place the circuitry of adaptor 255 in playback mode by manually shifting switch 330 indicated in FIG. 4*a* to the lower play position. The circuitry of FIG. 4a is preferably adjacent the tape deck, and the selector switches of FIG. 4*a* are ganged for conjoint manual operation with switch 330. Thus all of the record play switches in both the recorder and TV set are shifted by operating a single control. Switch 330 may itself be automatically rather than manually operated.

FIG. 9 illustrates diagrammatically a preferred tape transport arrangement wherein the reference numeral 350 indicates a shiftable head assembly including the audio head 270 and the video head assembly contained within the housing 90. Preferably the head assembly 350 includes a (minus Y) head unit 20 located between the head units 21 and 22 and the head units have the dimensions previously described. The audio head unit or units of the head assembly 350 are then located as indicated in the fourth figure of my copending application Ser. 439,340 and as previously described.

Tape guides for the tape 104 are indicated at 352, 353 and 354 so as to provide a tape path portion 356 between the head assembly 350 and capstan 358 and a second tape path portion 360 where capstan pressure roller 362 acts. In accordance with an important concept of the present invention, it will be noted that the tape portion 360 is directed generally at right angles relative to the tape path portion 356, and particularly that the capstan pressure roller 362 acts against the capstan 358 in a direction generally parallel to the tape path portion 356. More specifically, the capstan pressure roller 362 is illustrated as being mounted on an arm 365 which is pivotal on a pin 366 with the arm being urged in the counterclockwise direction by means of a tension spring 368 acting on the arm 365. In accordance with the present invention, the tension spring 368 exerts sufficient force so that the capstan roller 362 acts firmly against the capstan (through the tape 104) and prevents flutter of the capstan 358 in the direction of the tape path portion 356. It will be observed that any "play" in the bearings of the capstan 358 will thus result only in possible flutter of the capstan 358 in the general direction of the tape path portion 360 rather than in the direction of the tape path portion 356. Any flutter of the capstan 358 in the direction of the tape path portion 360 will not substantially affect the tape motion across the head assembly 350 because of the fact that such flutter is effectively at right angles to the direction of the tape path between the head assembly 350 and the capstan 358.

As described in my previous applications, the capstan 358 is preferably effective to provide uniform motion in each direction of movement of the tape 104 across head 350 so that only a single capstan is required driven by a reversible constant speed motor. The audio heads need not be symmetrical relative to the video head units if the same head configuration is used both for recording and playback of the audio and video signals. Further, time lags between the audio and video signals on playback resulting from a minor difference in placement of audio record and playback heads are not noticeable where the tape 104 travels at a relatively high speed.

During recording the component of magnetic biasing flux produced by the cross field windings 30–32 should have the proper phase relation to the component produced by bias frequency current in the recording windings 24–26. This may be accomplished by tuning capacitor C37 associated with cross field conductor 40 in FIGS. 1 and 4*a*. The capacitor C37 forms part of a circuit having a series resonance in the region of the bias frequency, so that the phase of the bias current may be advanced or retarded by tuning capacitor C37 from one side of resonance to the opposite side. In some cases it is found advantageous to increase the inductance of the X-field circuit by inserting an inductance in the lead 40, as indicated at 371. Alternatively, a phase shifting network may be inserted in conductors 40 and 41 of the cross field bias circuit or in the signal winding bias circuit associated with windings 23*a*–23.

For bi-direction tape transport, an alternative mode of operation is with the bias field component produced by cross field winding 30 having a phase angle of approximately 90 degrees relative to the bias field component produced by the winding 24, so that the bias frequency magnetic field associated with each head unit will be similar in each direction of movement of the magnetic tape 104.

The preferred circuit values of a successfully operating system in accordance with the present invention are given in the following tabulation.

Exemplary Circuit Values

Video Head Circuits, FIG. 4*a*

| | | | |
|---|---|---|---|
| Windings 24, 25, 26 | each | 200 | turns |
| Windings 64, 65, 66 | each | 1200 | turns |
| Resistors 77, 78, 79 | each | 8,200 | ohms |
| R16*a*, R16*b*, R16*c* | each | 10,000 | ohms |
| C8*a*, C8*b*, C8*c* | each | 100 | micro$\mu$f |

Video Playback Amplifier 74, FIG. 4*a*

| | | | | |
|---|---|---|---|---|
| R1 | 39,000 ohms | C1 | 25 | microfarads (electrolytic |
| R2 | 150 ohms | C2 | 15 | microfarads (electrolytic) |
| R3 | 33,000 ohms | C3 | .01 (10,000 | microfarad micromicrofarads) |
| R4 | 5,600 ohms | C4 | 60 | microfarads (electrolytic) |
| R5 | 10,000 ohms | C5 | 250 | microfarads (electrolytic) |
| R6 | 56 ohms | | | |
| R7 | 3,300 ohms | C6 | .005 (5,000 micromicrofarads) | microfarad |
| R8 | 5.6 ohms | C7 | 0.1 | microfarad |
| R9 | 150 ohms | C9 | .005 (500 micromicrofarads) | microfarads |
| R10 | 22 ohms adjustable | C39 | 0.03 | microfarad |
| R11 | 470 ohms | L1 | 10 | microhenries |
| R12 | 470 ohms | L2 | 240 | microhenries |
| R14 | 22 ohms | L3 | 50 | microhenries |
| R15 | 3,300 ohms | L4 | 50 | microhenries |
| | | L8 | 240 | microhenries |
| R17 | 180 ohms | Q1 | 16L64 | (Manufactured by General Electric Co. of U.S.A.) |
| R18 | 33 ohms | Q2 | 16L64 | (Manufactured by General Electric Co. of U.S.A.) |
| | | Q3 | 16L64 | (Manufactured by General Electric Co. of U.S.A.) |

The terminal B+ receives a direct current voltage relative to ground of 18 volts.

Resistor R19 has been replaced by a short circuit in amplifier 74. Resistor R19 is indicated in FIG. 4*a* so as to show its location in amplifiers 75 and 76.

VIDEO PLAYBACK AMPLIFIERS 75 and 76, FIG. 2

The circuit arrangement and circuit values for amplifiers 75 and 76 are the same as for amplifier 74 except that: (1) capacitor C9 and resistor R14 are eliminated in amplifiers 75 and 76; (2) inductor L2 and resistor R5 are replaced by a short circuit in amplifiers 75 and 76; and (3) elements R6, L8 and C39 are omitted in amplifiers 75 and 76. In amplifiers 75 and 76 there is an open circuit in place of the circuit comprising resistor R14 and capacitor C9 of amplifier 74, and in place of the circuit comprising R6, L8 and C39.

Audio Playback Amplifier 251, FIG. 4*a*

| | | |
|---|---|---|
| R20 | 1.5 | megohms |
| R21 | 100,000 | ohms |
| R22 | 220,000 | ohms |
| C10 | 20 | microfarads (electrolytic) |
| C11 | .01 | microfarad |
| L5 | 10 | microhenries |
| Q4 | 2N3391A Transistor Type | |

Power Supply 252, FIG. 4*a*

| | | |
|---|---|---|
| R13 | 680 | ohms |
| C12 | 550 | microfarads (electrolytic) |
| C13 | 500 | microfarads (electrolytic) |
| C13A | 500 | microfarads (electrolytic) |
| R52 | 10 | ohms |
| D1 | = | 1N1692 |
| D2 | = | 1N1692 |
| D1A | = | 1N1692 |
| D2A | = | 1N1692 |

Video Bias Oscillator 18, FIG. 4*a*

| | | |
|---|---|---|
| Frequency 3.6, 4.2, or 4.7 + | | megacycles per second |
| R23 | 6800 | ohms |
| R24 | 6800 | ohms |
| R25 | 5.6 | ohms |
| R26 | 5.6 | ohms |
| C15 (adjustable | | 200 micromicrofarads to 2000 micromicrofarads |
| C16 | 300 | micromicrofarads |
| C17 | 300 | micromicrofarads |
| C18 | .05 | microfarads (50,000 micromicrofarads) |
| Q5 | 7A30 | Manufactured by General Electric Co., USA |
| Q6 | 7A30 | Manufactured by General Electric Co., USA |

Video Bias Circuits, FIGS. 1 and 4*a*

| | | |
|---|---|---|
| C14*a* (adjustable) | 8 | micromicrofarads to 80 micromicrofarads |
| C14*b* (adjustable) | 8 | micromicrofarads to 80 micromicrofarads |
| C14*c* (adjustable) | 8 | micromicrofarads to 80 micromicrofarads |
| L6*a* | 100 | microhenries |
| L6*b* | 100 | microhenries |
| L6*c* | 100 | microhenries |

Adaptor Circuit 255, FIG. 4*b*

| | | | |
|---|---|---|---|
| R27 | 12,000 ohms | C19 | .006 microfarad (6,000 micromicrofarads) |
| R28 | 83,000 ohms | | |
| R29 | 100,000 ohms | C20 | .005 microfarad (5,000 micromicrofarads) |
| R30 | 47,000 ohms | | |
| R31 | 470,000 ohms | C21 | .05 microfarad (50,000 micromicrofarads) |
| R32 | 47,000 ohms | | |
| R33 | 680,000 ohms | C22 | 200 micromicrofarads |
| R34 | 470,000 ohms | C23 | .25 microfarad |
| R35 | 47,000 ohms | C24 | .002 microfarad (2,000 micromicrofarads) |
| R36 | 470,000 ohms | | |
| R37 | 8,200 ohms (adjustable) | C25 | .05 microfarad (50,000 micromicrofarads) |
| R38 | 47,000 ohms | | |
| R39 | 470,000 ohms | C26 | 200 micromicrofarads |
| R40 | 10,000 ohms (adjustable) | C27 | .25 microfarad |
| | | C28 | 200 micromicrofarads |
| | | C29 | .25 micromicrofarads |
| R42 | 1,000,000 ohms | C31 | 200 micromicrofarads |
| R43 | 100,000 ohms | C32 | 470 micromicrofarads |
| R44 | 5,600 ohms | | |
| R45 | 10,000 ohms | | |
| R46 | 1,500,000 ohms (adjustable) | | |
| R47 | 1,500,000 ohms (adjustable) | C33 | 8 micromicrofarads (adjustable) |
| R48 | 10,000 ohms | C34 | 8 micromicrofarads (adjustable) |
| R49 | 5,600 ohms | | |
| R50 | 10,000 ohms | | |
| R53 | 120,000 ohms (adjustable) | | |
| D3 | 1N463A | | |
| D4 | 1N463A | | |

Television Receiver Circuitry, FIG. 4*b* (added components)

| | | | | |
|---|---|---|---|---|
| R51 | 4700 | ohms | C36 | 1000 micromicrofarads |
| R54 | 47,000 | ohms | C38 | 8.2 micromicrofarads |
| L7 | 500 | microhenries | | |

The components R51, R54, L7, C36 and C38, and particularly resistor R54 and capacitor C38 may be physically located on the chassis of adaptor circuit 255. If components R54 and C38 were in the adaptor, switch 211 could be placed in the adaptor also, or conductor 85 could be permanently connected to the plate of tube V503B, and switch 211 omitted.

An improvement in vertical synchronizing has been obtained by increasing the value of the conventional component R504 from 200,000 ohms to 1.5 megohms.

Capacitor C37, FIGS. 1 and 4*a*, is adjustable from 100 micromicrofarads to 1,000 micromicrofarads; a typical setting is approximately 500 micromicrofarads, where the oscillator frequency is 4.2 megacycles per second.

Capacitor C35 bypasses high frequencies and is associated with the B+ lead 335 energizing each of the playback amplifiers 74, 75 and 76; its value may be 0.05 microfarad.

The resistor R17 and the corresponding resistors in playback amplifiers 75 and 76 may be of adjustable value and may be adjusted to set the direct current operating bias of the amplifiers 74–76.

The cable 256 may have a plug for fitting into a socket on the chassis of adaptor circuit 255.

In certain cases in the foregoing tabulation, a single value has been given for a variable capacitor or resistor. This single value represents a selected operating value. Suitable ranges of adjustment for these variable components are listed as follows:

| | | |
|---|---|---|
| R10 | 0 to 50 ohms | |
| R37 | 0 to 15,000 ohms | |
| R40 | 0 to 25,000 ohms | |
| R46 | .5 to 3 megohms | |
| R47 | .5 to 3 megohms | |
| C33 | 4 micromicrofarad to 16 | micromicrofarads |
| C34 | 4 micromicrofarad to 16 | micromicrofarads |

While a value of 15 micromicrofarads for capacitor C38 has been referred to earlier in this specification, the value of 8.2 micromicrofarads given in the foregoing tabulation has now been found to be preferable.

As previously mentioned, the system of FIGS. 1 and 2 may be utilized for recording broadcasts of monchrome signals. In this event it is advantageous to disable the color signal head units 21 and 22. Referring to FIG. 1, a first disabling switch 391 is indicated which in its upper monochrome position serves to by-pass cross field windings 31 and 32. Further switches 392 and 393 disconnect the signal windings of head units 21 and 22 so that the superimposed signal and bias current will not reach the head units 21 and 22. In FIG. 2, switches 394 and 395 may be utilized for disconnecting playback head units 21 and 22 during playback of a monochrome signal which may be recorded successive channels such as the six channels shown in FIG. 3. The switches 391–395 may be ganged for conjoint operation between their lower and upper positions and may be arranged for manual actuation.

Referring to FIG. 4*b*, the resistors R31, R36 and R39 serve to maintain the upper terminals respectively of capacitors C23, C27 and C29 at direct current ground potential (while the circuitry is in the playback mode) so as to prevent surges through the associated head windings during switching. These coupling capacitors have appreciable direct current potential across them during recording so that in the absence of the resistors, a charging of the capacitors would occur through the associated head windings when switching the circuitry between playback and record mode. Such current surges through the head windings would tend to produce residual magnetization of the head cores. (Such residual magnetization has various detrimental effects including noise and possible partial erasure of a signal recorded on the record medium.) Referring to the circuitry of FIGS. 4*a* and 4*b*, it will be observed that the video windings such as 24 have their upper terminals at direct current ground potential in the recording mode so that no current surges to the head windings will be produced where the upper terminals of the capacitors are maintained at direct current ground potential during switching.

Referring to the block diagram of FIGS. 1 and 2, in order to record the X and Z signals, suitable amplifier stages would have their respective inputs connected to the output of the X and Z demodulators, or to the grid circuits of tubes V706A, and V706B of the receiver circuitry shown in FIG. 4*b*. The outputs of such amplifier stages would then be connected to the recording equalizer circuits 15 and 16, respectively. Thus, in this case, the television receiver circuitry together with the amplifier stages would constitute the signal sources 11 and 12. Referring to FIG. 4*b*, the plates of the amplifier stages (whose grids are connected to the grids of tubes V706A and V706B) would be connected to conductors 212 and 215 in FIG. 4*b*, and the connection of the plates of tube V706B, and V706B with conductors 212 and 215 would be omitted. Similarly the (−Y) signal can be supplied by an amplifier stage whose input is connected to the grid of V304*a* or V708, and whose output is connected to 400 with switch 210 open.

The added video amplifier stages for the X and Z signals would not mix the signals, as actually occurs in the cathode circuits of tubes V706A and V706B. Each such amplifier stage may conveniently be provided by one-half of a single type 6GU7 double triode, with the B+ and filament power therefor supplied from the television receiver 88. The cathodes of such triode sections would be maintained at alternating current ground potential as by means of a large by-pass capacitor. For playback of the recorded X and Z signals, the outputs of the playback preamplifiers 75 and 76 would be applied to the grid circuits of tubes V706A and V706B, respectively, as indicated for example in FIG. 4b.

Referring to FIG. 1, if the (−Y), (R−Y) and (B−Y) signals are to be recorded, the sources 10–12 may include the television circuitry of FIGS. 4*b*, and the output from components 10–12 in FIG. 1 may be provided by the plate circuits of tubes V304A, V706A and V706B in FIG. 4*b*. Alternatively, to prevent loading of the television set circuits and for better matching to the recording circuits, separate amplifier stages or cathode follower stages may be used for the color channels with their inputs connected to the plate circuits of tubes V706A nd V706B, respectively, and their outputs connected to conductors 212 and 215; or with their inputs connected to other suitable R−Y and B−Y sources such as appropriate demodulator stages of a broadcast television receiver. When recordings have been made utilizing R−Y and B−Y sources, the playback signals from amplifier components 75 and 76 in FIG. 2 may (1) be matrixed at circuit 402 to give a G—Y signal if the color television set does not have this type of matrixing; or (2) the television receiver circuits may be modified for such matrixing during tape playback if the circuits do not normally provide the correct type of matrixing. By way of example, a G—Y signal may be derived from R—Y and B—Y signals by mixing 0.51 parts of the R—Y signal with 0.19 parts of the B—Y signal, and reversing the phase of the resultant signal. The matrixing component 402 shown external to receiver 88 performs the foregoing mixing and phase inverting function where the receiver circuit lacks such a circuit or a suitable substitute. Other types of matrixing circuits for deriving a G—Y signal are known in the art.

It has been found however that unmodified X and Z matrixing of the reproduced Y—R and Y—B signals as indicated in FIGS. 4a and 4b gives excellent results, particularly when color controls corresponding to the variable resistor R10 in amplifier component 74, FIG. *4a*, are used. The arrangement shown in detail in FIGS. *4a* and *4b* is simple and economical since it requires no power amplifiers other than those already in the commercial color television receiver. Excellent color rendition is obtained especially of orange-pink skin tones which are ordinarily difficult to reproduce even on direct broadcast reception.

In the specific circuit illustrated in FIGS. *4a* and *4b*, the principal color controls are variable resistors in the emitter circuits of the third transistor stage of the playback preamplifiers 75 and 76, the variable resistors corresponding to the variable resistor R10 of the playback circuit 74. These two principal color controls are preferably ganged on concentric shafts which are frictionally engaged with each other so that the gains of the color amplifiers 75 and 76 increase or decrease together as the knob assembly is turned; yet either of the concentric knobs may be turned individually by holding the other one back. These two controls are sufficient to change the picture from normal coloring to exaggerated color intensity, or to a light tint, or even to a monochrome rendition, according to taste. Alternatively, only the amplifier 75 may be provided with a variable resistor having a manual control knob on the user's external panel, the resistor corresponding the R10 of the amplifier 76 either having a preset value or being a fixed resistor of desired value.

Additional control of the color image during playback of a recorded tape is effected by adjustment of resistor R37 and resistor R40, FIG. 4b, which are used to set the background color. While these resistors may also be controlled from manual knobs on the operator's external panel they are not used as often once they have been set. The operation of the illustrated system is therefore simplified by placing the operating controls for resistors R37 and R40 at the side or in the back of the assembly rather than at the operator's panel. Alternatively resistors R37 and R40 may be replaced by fixed resistors having values of about 2,000 to 20,000 ohms depending on the design of the television receiver circuitry and the associated wiring.

The lower value of bias frequency of approximately 2.7 megacycles per second described herein which is in the frequency range of the video signals supplied to the receiver circuitry 88 had previously been considered to be too low to be operative; a bias frequency of 4 to 5 times the upper limit of the recording range being ordinarily considered optimum; or in any event it was considered that the bias frequency should be well above the upper limit of the recording range. It has been found, however, that a bias frequency of approximately 2.7 megacycles per second allows the use of high frequency bias with heads that would be unuseable at higher bias frequencies because of excessive losses and head saturation. This relatively lower bias frequency also allows the use of high frequency bias where bias of adequate amplitude would be impossible at higher bias frequencies. With the use of bias signal isolation means (such as wave traps 44–46) the relatively lower bias frequency of approximately 2.7 megacycles per second is useable without appreciable interference with the television circuits.

As previously described, FIG. 10 shows a curve 336 representing the response of signal current in a video head winding such as 24 as a function of frequency for a constant voltage input to the first video amplifier stage such as represented by tube V304A in the recording mode of the circuitry. The overall recording head current characteristic at highest frequencies has a response which is higher than that indicated, because of peaking in the IF detector section of the receiver circuitry when recording a broadcast signal.

FIG. 11 shows details of a preferred head mounting assembly. The reference numeral 454 designates generally a head positioning device similar to that disclosed in my copending application U.S. Ser. No. 493,271. Most of this device is made of brass. The head assembly 350 is mounted on a travelling nut 472, which is made of bronze. The head is connected to the travelling nut 472 by means of a spring (not shown). The spring is made of hardened steel, which has been heat treated at 1,500° F. and drawn at 750° F. In order to avoid play in the positioning of the head, a guide 473 on the body of the positioner in which the head mount slides must be fabricated very accurately; i.e., the dimensions of the grooved channel 473*a* in the positioner (0.116, 0.226 and 0.280 inch) must be attained with the highest conventional machine shop accuracy possible. It is also important that the center line of the head positioner be accurately maintained to provide the required sliding surface for the travelling nut 472.

The other components of the head positioner 454 are a drive spring 475, a washer 476, an index knob 477 for rotating a lead screw 478, and a ball and spring detent assembly indicated at 481 for determining the operating settings of the index knob 477. The lead screw 478 may be made of stainless steel and may have a thread pitch of 40 thereby providing a vertical displacement of 0.025 inch for every turn of the index knob 477. For the head arrangement illustrated in FIG. 3, one rotation of the index knob 477 would serve to shift the head assembly by a distance corresponding to the center to center spacing between successive channels such as 104*a* and 104*d*. The thread pitch preferably would be selected so that one rotation of the knob 477 would index the head units between successive channels. Thus, if the center to center spacing between the head units as viewed in FIG. 3 were 88.5 mils, one rotation of the index knob 477 would shift the head units one-half of this distance, referring to the head arrangement of FIG. 3. Other suitable head indexing arrangements are illustrated in my copending applications Ser. No. 401,832 and Ser. No. 456,192.

In FIG. 11, the head positioning assembly 454 is shown as being mounted on a plate 485 which is pivotal relative to a fixed frame 487 about a fulcrum indicated at 489. The angle of plate 485 is shown greatly exaggerated with respect to frame 487; normally they are parallel within minutes of arc. The plate 485 is provided with apertures at opposite sides of the fulcrum 489, one aperture receiving a threaded element 490 secured to the frame 487 and confining a compression spring 491 so that the spring tends to urge the plate 485 in a clockwise direction about its fulcrum while accommodating a desired range of angular adjustment of the plate. The other aperture receives a threaded adjustment element 494 which has an enlarged shoulder abutting the plate 485 so as to limit the pivotal movement of the plate in the crosswise direction under the urging of the compression spring 491. The element 494 is threadedly engaged in the fixed frame 487 and has an appreciable range of adjustment in opposite axial directions from the position illustrated in FIG. 11. A differential thread may be used to give very fine adjustment corresponding to turning of 499. The position of adjustment of the element 494 represented in FIG. 11 and corresponding to the gaps perpendicular to the tape axis for example may be termed its normal position for recording and is made apparent to an operator by means of a spring urged detent ball 496 cooperating with an annular groove 497*a* of a disk 497 secured to the element 494. The groove 497*a* has a generally V cross section so that as the element 494 is turned in either direction, the detent 496 is caused to ride on one of the sloping walls of the groove 497a against the action of the compression spring 498. The detent arrangement 496, 498 thus resists manual turning of the element 494 out of its normal position and defines a range of adjustment (determined by the width of the V-groove 497*a*) whose extreme limit are preferably such that the corresponding azimuth errors of the gaps of the head units are still insufficient to substantially harm the high frequency response of the head units. The element 494 may have a knurled enlarged end portion 499 for convenience of manual adjustment of the angular position of the element 494.

With pre-recorded tapes using multiple channels it has been found that misregistration may be corrected by adjusting the head angle with respect to the tape by an amount less than that required to alter appreciably the optimum azimuth alignment of the gap of the head relative to the direction of movement of the tape. Such an adjustment which may be of the order of a minute of arc or less may be made by rotating element 494 and this structure provides for a simple alignment of the video head units 20–22 with the desired channels of a prerecorded tape. The device is easy to use for an inexperienced operator who can readily rotate the element 494 while watching the reproduced image from the tape. When the head assembly is to be utilized for a recording operation, it is a simple matter to rotate the element 94 until the device resumes its normal position with the detent ball 496 at the bottom of the groove 497*a*. Generally, this normal position will be one in which a line or transverse axis extending through the gaps such as 108–110 of the head units 20– 22 will extend precisely at right angles to the direction of movement of the tape across the head assembly.

The mechanism of FIG. 11 can also be used to provide a variable time delay instead of using the much more expensive variable delay lines. The setting can be such as to introduce the correct delay between color channels scanned by head units 21 and 22 instead of or in connection with delay lines. The rotation of element 494 or a comparable adjustment can, of course, be servo controlled where automatic delay variation is desired for example for the purpose of correcting for flutter in tape movement. The arrangement of the head units 20–22 may be such as to give the desired displacement of the gaps relative to one another as the angle of the head assembly is changed by element 494. The smaller the lateral width of the heads in comparison to the spacing between the heads the greater the advance or delay and the greater the angular adjustment which is possible without adversely effecting high frequency response.

FIG. 12 illustrates a recording system in accordance with the present invention wherein a plurality of color television signal components such as a −Y signal, a X signal and a Z signal together with a related sound signal are all recorded on a single channel of a magnetic record medium by means of a recording head such as diagrammatically indicated at 500 in FIG. 12. The recording head 500 may have the configuration illustrated in FIGS. 5 and 6, for example, and the tape may be moved across the head in the manner illustrated in FIG. 9. The head 500 may be indexed between successive channels and the tape driven in alternate directions by any of the means previously described.

FIG. 12 indicates suitable sources at 501–504 for supplying the −Y, X, Z and sound signals respectively. These signals are supplied to suitable filters indicated at 511 through 514 which may respectively pass frequency components in the frequency ranges 0 to 1.8 megacycles per second, 0 to 250 kilocycles per second, 0 to 250 kilocycles per second, 0 to 20 kilocycles per second; or the signals may already be so limited. The output signals from filters 512–514 are supplied to respective modulator components 522–524 which receive carrier signals from respective local oscillators 526–528. By way of example, the oscillators 526–528 may supply carrier frequencies of 2.25 megacycles per second, 2.85 megacycles per second and 1.9 megacycles per second, respectively. The output of the filter 511 and the modulator components 522–524 are supplied to a mixer component 530 wherein the respective output signals are amplified if necessary and combined into a single composite signal for energizing the recording head 500 as a magnetic tape record medium travels successively across the poles of the head.

The transducer head 500 is preferably operated so as to record frequencies up to an upper limit of approximately 3.2 megacycles per second, and to this end a somewhat higher bias frequency signal is preferably supplied to a cross field conductor of the head 50 such as indicated at 30 in FIGS. 5 and 6.

The sources 501–504 may comprise the plate of the audio output tube V106, the grid of the first video tube V304A and the grids of tubes 706A and V706B of the circuitry of FIG. 4*b*. Preferably the −Y source 501 includes horizontal and vertical sunc pulses, while preferably the sources 502 and 503 supply the X and Z signals without any sync or blanking pulses. Thus the components 502 and 503 preferably include means for removing the sync or blanking pulses where the X or Z signals are to be combined with another signal such as the −Y signal having such sync pulses.

As one alternative, the modulators 522–524 may include suitable filter means so as to transmit the carrier frequency and the lower side bands while attenuating the upper side bands so as to provide what may be termed vestigial side band modulation (either amplitude or frequency modulation).

In this case the filters 512 and 513 may transmit up to 0.5 mc.and the carrier frequencies are accurately located near or somewhat below the upper edge of the transmission bands as for example 2.5 mc.for the X carrier and 3.1 mc.for the Z carrier. The upper side band frequencies are substantially attenuated and only a residual upper side band is transmitted, so as not to interfere with the adjacent signals. The carriers may also be located at the lower end of the single side band spectra, at 2.2 mc. and at 2/6 mc. instead of at 2.5 and 3.1 mc.

As a second alternative, carrier modulated signals may be obtained directly from a composite signal such as the NTSC standard broadcast signal by the use of heterodyning technique. For example, the color signal modulation may be combined with the 3.58 megacycle per second oscillator output of the television receiver at the correct phase to give an X modulated carrier which is then heterodyned (by means of an oscillator at 5.83 megacycles per second) to 2.25 megacycles per second (plus or minus 0.25 megacycles per second side bands) and this modulated 2.25 megacycle per second color signal may then be supplied to the mixer and equalizer components 530. The color signal modulation may also be combined with the 3.58 megacycle per second oscillator output at a phase differing by 57.3° to give a Z modulated carrier which is then heterodyned (by means of an oscillator at 643 megacycles per second) down to 2.85 megacycles per second and supplied to the mixer and equalizer circuit 530. Alternatively R−Y and B−Y modulated carriers are obtained using 90° phase differences with reference to the 358 mc. controlled oscillator in the TV set.

It will be understood that an inexpensive color television camera may be utilized for local pick-up and need not have the 3.58 megacycle per second color carrier included; in this case the circuitry of the sources 501–503 need only include suitable matrixing to give a Y or −Y, a R−Y and a B−Y signal, for example. The sources 502 and 503 could further include means for mixing the R−Y signal with the 3.58 megacycle per second carrier from the receiver circuitry, and the source 503 would include suitable circuitry for shifting the phase of the 3.58 megacycle per second carrier by 90° and for mixing the carrier with the B−Y signal. The oscillators 526 and 527 would then have values such as 5.83 megacycles per second and 6.43 megacycles per second as previously mentioned. The camera signals could also be fed to 10, 11, 12 of FIG. 1. In either case the color TV set itself can monitor the picture while recording.

As a third alternative, for higher quality reproduction where the tape recorder has a response to about 5.5 mc. the sources 502 and 503 may be connected to the receiver circuitry so as to provide carriers with single sideband modulation containing the I and Q color information, for example with a carrier frequency of 3.58 megacycles per second, and these I and Q subcarrier color signals may be supplied to the components 522 and 523 for heterodyning to suitable carrier frequencies such as 4.7 megacycles per second and 5.3 megacycles per second, with the −Y signal ranging from 0–3 mc., and the sound carrier at 3.1 mc. A preferred illustrative arrangement of this system is to record the −Y signal in the spectrum from 0–3 mc.; the sound on a carrier at 3.1 mc.; the Q chroma component in the spectrum from 3.4 to 4.9 mc. with its carrier at 3.4 mc. or slightly above; and the I chroma component from 5.0 to 5.5 mc. with its carrier at 5.0 mc. or slightly above. This has the advantage that if some of the highest frequencies are lost (these being the most viable in a tape system) only the finer details of one chroma signal are lost which would hardly be noticeable. The carriers sound, and monochrome components are safe at lower frequencies.

FIG. 13 illustrates diagrammatically a playback system for reproducing a tape recorded by the system of FIG. 12. The playback system may include a preamplifier and equalizer component 535, a delay component 540 and signal processor components 541–544. The signal processor components are operated so as to reobtain the color television signal components supplied at the outputs of filters 511–514. These signals are then utilized to generate a color visual image in any of the ways described in conjunction with the previous embodiments. The component 541 is an amplifier with a band pass to 1.8 mc. for example. The delay component 540 may follow 541 instead of preceding it, or may be omitted and alternation means used. Components 542, 543, 544 may include tuned circuits centered respectively around the recorded carriers of 2.25 mc., 285 mc., and 1.9 mc. (or 50 kc. or 35 and 70 kc. depending on the choice of sound carrier). The selected carriers and their included sidebands are then demodulated, filtered, and amplified if necessary to yield the −Y, X, Z and sound components at the output of 541–544.

FIG. 14 illustrates another recording system for recording color television and sound information on a single channel of a record medium. In this embodiment a recording head is indicated at 600 which may correspond to the recording head 500 previously described. Suitable signals are obtained from a component 601 which may comprise the color television receiving set or inexpensive color television camera previously referred to. As previously mentioned, the camera would include suitable matrixing circuitry to provide a minus Y, R−Y and B−Y or other desired color television signal components. By way of example −Y, X and Z color television signal components may be supplied to components 611–613, and suitable sound signals associated with the color image may be transmitted to a sound amplifier 614. The output of the amplifier and equalizer or other coupling circuit 611 is supplied to a mixer component 620. Alternate lines of the X and Z signals are interleaved by means of an electronic switch 622 and the resultant composite X and Z signal is supplied to a modulator component 623. As indicated, the electronic switch 622 may be synchronized by means of the horizontal synchronizing pulses at the output of component 611 which are shown coupled to a keyer component 625 so as to deliver switching pulses to the switch component 622 at the horizontal line rate corresponding to the interval H in the waveform 626. The pulses in the waveform 626 are of course synchronized with the X and Z signals so that switching takes place during the horizontal retrace intervals of the X and Z signals. Every other horizontal synchronizing pulse to 654 may be distinctive having a somewhat different amplitude or width, so alternate lines can be recognized by the playback circuits. The output of the switch 622 is converted to a suitable modulated carrier signal by means of the modulator component 623 and a suitable local oscillator component 630 which may operate at a frequency of 2.5 megacycles per second, for example.

Modulator component 634 associated with the sound amplifier 614 may have a local oscillator 635 operating at a frequency of 2.0 megacycles per second, for example.

FIG. 15 illustrates a system for reproducing a signal recorded by the system of FIG. 14 and utilizing the same transducer head 600. The reproduced signal is supplied to a preamplifier and equalizer components 650 and then through the primary windings of transformers 651 and 652 to the input of a filter component 654. By way of example, the filter 654 may have a pass band in the region from 0 to 1.9 megacycles per second so as to transmit the –Y signal to amplifier component 656. The secondaries of the transformers 651 and 652 are turned by means of variable capacitors 671 and 672 to frequencies such as 2.0 megacycles per second and 2.5 megacycles per second and are connected respectively to sound demodulator component 675 and band pass amplifier and demodulator component 676. The output of the component 676 is thus the interleaved X and Z signal generated at the output of the electric switch component 622 during recording. This composite X and Z signal is supplied to an electronic switch component 680 which is actuated in synchronism with the horizontal line rate of the reproduced signal by means of a keyer component 681 so as to supply the time spaced X lines of the X signal to amplifier 684 and to transmit the alternately occurring Z lines to the amplifier component 685. The keyer 681 may contain circuits to recognize the distinctive variation in alternate synchronizing pulses previously recorded. The outputs of the amplifier components 666, 684 and 685 and the output of the sound demodulator component 675 may be utilized as in any of the previously described embodiments.

If it is desired to include each of the X lines of the X signal and each of the Z lines of the Z signal rather than alternate such lines, components 690–693 may be included and switch 694 may be in its closed position. The component 690 may comprise a magnetic drum rotating at such a speed as to introduce a time delay H (FIG. 13) between recording head 691 and playback head 692 with erasure of the signals prior to reaching 691 again. Thus the output of the playback head 692 will be delayed by one line relative to the input to the electric switch 680. Accordingly the electronic switch 693 which is also operated by the keyer component 681 supplies at its output X lines which interleave with the X line output from switch 680 and Z lines which interleave with the Z line output from switch 680.

By way of example in the embodiments of FIGS. 14 and 15, the modulator 623 may supply a double side band amplitude modulated signal. While a time delay means in the form of a magnetic drum 690 has been indicated in FIG. 15, other electronic or electromechanical delay systems may be employed. The electronic switch 693 may, of course, be closely associated with the electronic switch 680 and use common circuits and components except for the provision of the second switch element operating out of phase with the switch element of component 680. As indicated while the switch element of component 680 is connected to amplifier 684, the switch element of component 693 is connected to amplifier component 685, and vice versa.

FIG. 16 illustrates a recording system wherein two head units 701 and 702 are associated with respective channels of a magnetic record medium. The head units may cooperate with spaced channels of the record medium as indicated for head units 20 and 21 in FIG. 3 for example. The head configuration and tape transport may conform to that shown in FIGS. 5 through 9, and the head mount may include the features of FIG. 11. In the embodiment of FIG. 16 reference numerals 711 through 714 may represent suitable sources for a –Y signal, and X signal, a Z signal and a sound signal associated with the color image. Component 711 is shown as being coupled directly to the recording head unit 701 and this circuitry may conform with that previously described. The component 712 is shown connected directly to the recording head unit 702, while the component 713 is connected to the head unit 702 through a modulator component 716 supplied by a local oscillator 717 so as to displace the frequency spectrum of the Z signal relative to the X signal. The horizontal and vertical sync pulses may be removed as mentioned in connection with a preceding embodiment, and suitable filtering may be employed to avoid any substantial overlapping of the signals being mixed. Suitable mixing and equalizing circuits may be employed as in the other embodiments The sound source 714 is connected to a modulator component 720 having a local oscillator 721 and the output of the modulator 720 is also suitably displaced in frequency relative to the outputs of components 712 and 716. By way of example component 711 may include filtering means for supplying a bandwidth extending from 0 to approximately 2 megacycles per second to the head 701. The source 712 may include filtering means so as to supply an X signal bandwidth from 0 to 0.5 megacycles per second and the component 713 may supply a Z signal having a bandwidth of 0 to 0.5 megacycles per second. The oscillator 717 may operate at 1.2 megacycles per second while the oscillator 721 may operate at 1.8 megacycles per second.

By way of example, modulators 716 and 720 may supply double side band amplitude modulated signals, and this type of signal has the advantage of enabling the use of simple modulators and demodulators (diode detectors) and can tolerate flutter in tape movement in contrast to the very critical synchronous quadrature demodulation required for standard NTSC color signals. The sound source 714 may include suitable filtering means to provide a frequency band from 0 to 15 kilocycles per second, for example, for the other values with respect to this embodiment.

As another example, a suitable bias coupling transformer may have its secondary in series in output line 730 from component 711, and the primary of the transformer may be energized by a bias oscillator operating at a frequency of 6 megacycles per second, for example; and similarly bias may be injected in line 731. For carrier recording of the X signal the conductor 731 leading from the component 712 may have a modulator component interposed therein with a local oscillator operating at 1.7 megacycles per second, while local oscillator 717 may operate at 0.7 megacycles per second and oscillator 721 may operate at 60 kilocycles per second. If a second sound channel is utilized as in stereo, a further modulator may be provided having a local oscillator operating a frequency of 120 kilocycles per second, the output of the modulator also being connected through suitable mixing circuitry with the head 702. Where carriers are used the high frequency bias may be omitted.

FIG. 17 illustrates the playback system for reproducing signals recorded by the system of FIG. 16. By way of example the playback system may utilize the same head units 701 and 702, the head unit 701 being connected to a −Y preamplifier component 740 and the head unit 702 being connected to an X, Z and sound preamplifier and equalizer component 741. The output of the preamplifier component 740 may be optionally supplied to a delay line component indicated at 742 and then to a band pass amplifier component 743 which may transmit frequency components between 0 and 2 megacycles per second, for example. The output of component 741 may be supplied through the primaries of two transformers 745 and 746 to a band pass amplifier 747 having a pass band between 0 and 0.5 megacycles per second to supply the X signal. The secondary of transformer 745 is tuned by means of a variable capacitor 749 to a frequency of 1.2 megacycles per second corresponding to the frequency of the local oscillator 717 so as to supply the Z signal to a Z demodulator component 751. The output of the component 751 is supplied to a band pass amplifier component 752 having a pass band between 0 and 0.5 megacycles per second.

The secondary of transformer 746 is tuned by means of a capacitor 755 to the carrier frequency of the sound signal, for example 1.8 megacycles per second so that the sound signal is supplied to a sound demodulator component 757 for demodulation after which the signal is amplified by means of a band pass amplifier component 758 having a pass band between 0 and 15 kilocycles per second, for example.

The playback circuitry and tuned circuit values would, of course, correspond to those utilized in the recording process. The outputs of components 743, 747, 752 and 758 may be supplied to conventional color television broadcast receiver circuitry as in the previous embodiments.

In the various embodiments described with reference to FIGS. 12–17, the exact carrier frequencies and band widths may be varied to fit the capabilities of the recording system at the chosen tape speeds. Amplitude modulation is shown as an example, but frequency modulation may be utilized instead. Single side band, or vestigial side band type amplitude or frequency modulation may also be utilized.

FIG. 18 illustrates a recording system utilizing three head units 801–803 for recording on respective channels of a record medium, and these head units may conform to the disclosure in connection with FIG. 3 and FIGS. 5 through 9 and 11. In the illustrated arrangement a −Y signal source 805 is connected to the head unit 801, a X signal source 806 is connected to the head unit 802 and a Z signal source 807 is connected to the head unit 803. These signal sources may comprise the circuits of a conventional color television broadcast receiver circuit as previously discussed in detail herein. An audio signal source 808 preferably comprises the conventional 4.5 megacycle per second frequency modulated audio signal found in the conventional color television broadcast receiver. This frequency modulation signal is supplied to a mixer component 810 along with a carrier wave from an oscillator component 811 which preferably constitutes the bias frequency source for the recording system. By way of example, the oscillator 811 may operate at a frequency of 5.5 megacycles per second to produce at the output of the mixer circuit 810 a frequency modulated wave operating at a carrier frequency of 1 megacycle per second and conveying the audio intelligence. This audio intelligence signal may be supplied either to the head unit 802 or the head unit 803, for example. The dash line 814 indicates the alternative connection. By way of illustration, the oscillator 811 is shown as energizing the primaries of transformers 821–823 so as to introduce a bias frequency signal into each of the head units 801–803. It will be understood, of course, that suitable cross field conductors are preferably also associated with the head unit and energized from the oscillator component 811.

FIG. 19 illustrates the system for playing back a tape recorded by the system of FIG. 18 and has been illustrated by way of example as utilizing head units 801–803. With this system the outputs of head units 801–803 are supplied to suitable preamplifier components 831–833 and then to suitable amplifier components 836–838. The output of components 836–838 may be supplied at suitable points in the conventional color television receiver circuitry as previously explained. A transformer 840 is shown as having its primary in the output circuit of the Z preamplifier 833 and having its secondary winding tuned by means of a variable capacitor 841 to the sound carrier frequency of 1 megacycle per second. This sound signal is mixed with a 5.5 mc local oscillator signal from component 843 in a mixer component 844 preferably to provide a 4.5 megacycle frequency modulation output signal from the mixer 844 which may conveniently be supplied to the sound IF and detector stages of a conventional color television broadcast receiver set as will be readily understood by those skilled in the art. The tuned secondary of transformer 840 should, of course, have sufficient band pass to properly transmit the 1 megacycle per second frequency modulation signal to the mixer 844. It will be apparent that two channel stero sound signals could be recorded on the X and Z channels of the video circuits utilizing suitable carrier frequencies such as 1 megacycle per second as illustrated for the single channel case.

Where the −Y signal is recorded on one channel, and the colors on a separate channel, the chroma system might have a local oscillator of 5.37 megacycles for heterodyning the 3.58 megacycle signal carrying the X sidebands to produce a 1.79 megacycle carrier for example; while the local oscillator for the 3.58 megacycle signal carrying the Z sidebands have a frequency of 4.27 megacycles per second to produce an 0.69 megacycle carrier, for example. The sound may be carried on a 50 kilocycle per second carrier, or on 35 and 70 kilocycle per second carriers for two channel stereo sound, the two modulated carriers also being supplied to head 702. As a modification, the synchronizing signals may be removed from the −Y channel and the vertical sync may be recorded on a carrier having the frequency of the horizontal synchronizing pulses of the receiver and also supplied to the head 702. The horizontal sync signal may be retained as part of the monochrome signal, or recorded as a carrier modulated wave at 702 if desired, but this is not so necessary from the standpoint of avoiding interference.

While for illustrative purposes, cross field conductors 30–32 have been illustrated as making a single turn about the poles of the respective head units, it is considered preferable to form the cross field conductors of a thin flat ribbon of conductive material arranged substantially as indicated at 30 in FIGS. 5 and 6 but preferably forming a plurality of turns about the head core rather than a single turn as specifically shown in FIGS. 5 and 6. It will, of course, be understood that the successive turns of the ribbon conductive material are suitably insulated. An example of a winding configuration would be one where one end of the conductive ribbon engages and is secured to the conductor 115, FIG. 5, the ribbon with its insulation following the path **30*a*, 30*c*, 30*b*, but extending from 30*b* inside of conductor 116 and about the outside of conductor 115 so that a desired number of turns may be made with the opposite end portion of the conductive ribbon then more nearly following the path indicated in dash outline at 30*b* so as to make contact with the other conductor 116. The appearance of the ribbon cross field conductor winding in side elevation would essentially conform with that illustrated in FIG. 6 with the upper edge of the successive turns of the ribbon at 30*a* and 30*b* conforming with the tape path at the regions of the tape path (termed the recording regions) where effective recording takes place in each direction of movement of the tape 104. While with a single turn winding such as specifically indicated at 30 in FIG. 5**, the bias frequency current might have a r.m.s. amplitude in the range from 1 to 5 amperes at a frequency in the range from 4.2 megacycles per second to 4.4 megacycles per second, for example, where 5 turns of the cross field conductor are employed, the bias frequency current would be reduced correspondingly to one-fifth the previous range of values. The proper bias current will, of course, depend upon a number of factors, so that the examples given herein are simply to indicate the order of magnitude for a particular head configuration and other selected operating conditions.

In the various embodiments, as an alternative, the horizontal and/or vertical synchronizing pulses may be recorded on a separate channel of the record medium from those scanned by the video head units receiving the various color television signal components, in demodulated form or expressed as amplitude or frequency modulated waves.

It will be apparent that in each of the embodiments the color television signal components may take various form other than −Y, X and Z such as for example Y, I and Q; R, G and B; −Y, (R−Y) and (B−Y); −Y, (G−Y) and (B−Y); etc. Also for economy a two-color system might be recorded as −Y and (R−Y) only; or preferably −Y and I only; etc. For the two color system, the Z or the B−Y components in the illustrated examples would be omitted. Such a two color system is attractive from the standpoint of enabling use of an economical amateur color camera, which would supply only the −Y and one chroma signal preferably along or near the orange-red and cyan axis. The recorder could still be used for the −Y and both chroma components on broadcast TV signals, or with a more expensive camera.

It may be desired to use the video recorders described here with an ordinary TV set without any internal connections to the set.

Playback of a recorded tape can be effected by feeding the outputs from 84, 75, and 76 in FIG. 2 to modulators which operate on a signal generator having a carrier frequency tuned to a TV channel that is not broadcast in that region, for example channel 6 in the Chicago area. For example with the NTSC system, the outputs of 75 and 76 would quadrature modulate 3.58 mc. in a suppressed carrier system, giving sidebands ranging from about 3.08 to 4.08 mc. These are combined with the signal from 84, a burst keyer sound carrier etc. to modulate the TV carrier with a signal that can be handled by an NTSC receiver, and the resultant output is connected to the TV set antenna terminals and tuned in on channel 6 just as with a broadcast station. Very low power is required, so that small transistor circuits can be used, and these can be further simplified by the fact that the signal is not actually broadcast, so that double sideband modulation and other departures are possible. High drive stability can be obtained from a system such as in our Ser. No. 456,192, or a variable delay line can be used to compensate for speed variations.

Recording may be done by building into the recorder RF, IF and video circuitry similar to that found in a color TV set, and feeding these into 14, 15, 16 of FIG. 1. The IF and RF portions may be eliminated if it is allowable to place a capacitive pickup near the IF output circuits of the TV set; a suitable pickup being a cap or ring placed on the final IF amplifier.

Any of the embodiments described herein may utilize transversely moving heads or other area scanning recording and playback systems. Where multiple head units are required, in a rotating head arrangement the head units are mounted parallel to each other on the rotating mechanism and connected to the stationary circuits through slip rings, rotary transformers, or the like.

In one arrangement for the components of FIG. **4*a* and 4*b*, the tape deck would be housed with the playback amplifiers 74–76 and the circuitry within the box 250 of FIG. 4*a*. The cable 256 would be secured to this tape deck cabinet and would have a plug for detachably coupling these components with the adaptor circuitry 255 which would be associated in the cabinet with the television receiver. Thus the socket associated with the adaptor circuit 255 would be carried by the cabinet for the television receiver. The operating panel with the pushbutton controls for the tape transport would also include preferably the two coaxial frictionally coupled manual controls controlling the variable resistors corresponding to R10 for amplifiers 75 and 76. The tape deck panel would also include a manual control for actuating switch 330 to place the circuitry selectively in playback or record mode. The relay 325 controlled by switch 330 would, of course, be associated with the television set cabinet. The controls for variable resistors R37 and R40 would be at the back side of the tape deck cabinet, for example. The manual control operating the ganged switches 391–395, FIGS. 1 and 2**, would be on the user's panel of the tape deck with the other controls just described.

It may be noted that high frequency bias frequencies as low as 1.7 megacycles per second have been utilized with video recording heads for recording television bandwidth signals. It may be noted that the signals reproduced from the magnetic tape as taught in any of the embodiments of the present invention herein disclosed may thereafter be converted to standard broadcast NTSC signals either for broadcast or for transmission over a closed circuit system to remote color television receiving sets.

It may be noted that my copending application Ser. No. 393,281 discloses in the first figure, for example, a system for recording a video and an audio signal on a single channel of a record medium. This system and its playback circuit in the first A figure of said copending application are applicable to color television recording as taught in the various embodiments hereof, and the disclosure of said copending application is incorporated herein by reference as illustrating further color television recording systems.

With the values given herein the color preamplifiers 75 and 76 are provided with a reduced response to the high frequencies at the upper end of the response bandwidth as compared to the response of the monochrome preamplifier 74 to such high frequencies.

With the high resonance and low resonance head windings such as indicated at 24 and 64 connected in series aiding, each winding has a different frequency of peak output. By proper selection of the value of resistive loading of the windings, the induced voltage at least in the low resonance winding does not reverse in phase with respect to the recorded flux except at a single crossover frequency in the overall frequency range.

The resistive loading may be such that the net voltage output from the combined windings reverses in phase at only one point, called the crossover frequency, in the overall frequency range of the playback system. The input circuits of the preamplifiers 74–76 connected to the head units advantageously may provide the desired resistive loading.

The −Y playback amplifier FIG. 4a with R10 = 22 has typically a maximum gain of about 3,000 at a frequench of 600 cycles, with a rounded peak falling to a gain of 500 at about 100 cycles and at about 4 kc. It continues to drop as the frequency is raised above 4 kc., to a broad valley of gain equal to about 200 in the region from 10 kc. to 300 kc., then rises with increasing rapidity to about 1,000 or more gain at 1.5 mc. The $R_6$ $L_8$ $C_{39}$ network gives a broad rise of about 2 db. centered at a 65 kc. frequency, and compensates for a wavelength-associated dip in head response at this frequency. The overall response to transients and square waves is almost perfect in the 7 kc. to 100 kc. range.

The response of the X and Z preamplifiers represented by FIG. 4a with the indicated modifications is similar to that of −Y except that the response at frequencies above 500 kc is lower by about 6 decibels or more. As the resistance corresponding to R10 for the X and Z preamplifiers is varied from 0 to 50 ohms the gain in the plateau region from 10 kc to 300 kc varies from about 2,000 down to about 120 (being about 250 when R10 is 20 ohms).

The response of all the preamplifiers falls at a rate which exceeds 6 decibels per octave in the region between 1 kc and 10 kc; and particularly the −Y amplifier rises at a rate exceeding 6 decibels per octave in the vicinity of a megacycle. These reates are responsible for the excellent overall transient response of the system.

It will be apparent that many modifications and variations may be effected without departing from the scope of the novel concepts of the present invention.

I claim as my invention:

1. In combination with a color television broadcast receiver having a plurality of color signal circuits along which respective color television signals are transmitted when the receiver is tuned to a color television broadcast signal, a video transducer device comprising a video transducer head having a plurality of head units for coupling to respective channels of a record medium, coupling means for coupling the respective color signal circuits of said receiver to the respective head units for recording of the respective color television signals on the respective channels of the record medium, and for connecting said head units to said color signal circuits during playback of the color television signals recorded on the record medium for reproduction by means of said color television receiver of the color image represented by the recorded signals, said coupling means comprising adapter circuitry which includes switches positionable in first and second positions, said first position permitting recording of said color broadcast signal and said second position permitting playback of said recorded signal, said switches in said first position enabling use of the receiver for the reception and display of a color television broadcast signal, said coupling means further comprising a detachable cable for interconnecting said adapter circuitry with said transducer device during recording and playback operation, and means for automatically placing said switches in said first position upon detachment of said cable to disconnect said video transducer device from said adapter circuitry while permitting selective operation of said switches with said cable remaining in the interconnecting condition.

2. In combination with a broadcast television receiver having television signal circuit along which a television signal is transmitted when the receiver is tuned to a broadcast television signal, a video transducer device comprising a video transducer head for coupling to a record medium, coupling means for coupling the television signal circuit of said receiver to the transducer head for recording of the television signal on the record medium, and for connecting said transducer head to said signal circuit during playback of the television signal recorded on the record medium for display by means of said television receiver of the image represented by the recorded signal, said coupling means comprising adapter circuitry which includes switches positionable in first and second positions, said first position permitting recording of said broadcast signal and said second position permitting playback of said recorded broadcast signal, said switches in the first position enabling use of the receiver for the reception and display of a broadcast television signal, said coupling means further comprising a detachable cable for interconnecting said adapter circuitry with said transducer device during recording and playback operation, and means for automatically placing said switches in said first position when said video transducer device is disconnected from said adapter circuitry by detachment of said cable, while permitting selective operation of said switches when said cable remains in the interconnecting condition.

* * * * *